US008897643B2

(12) United States Patent
Raponi et al.

(10) Patent No.: US 8,897,643 B2
(45) Date of Patent: Nov. 25, 2014

(54) CONTROL OF TOKEN HOLDING IN MULTI-TOKEN OPTICAL NETWORK

(75) Inventors: Pier Giorgio Raponi, Rovereto (IT); Nicola Andriolli, Pisa (IT); Piero Castoldi, Vicopisano (IT); Marzio Puleri, Fiano Romano (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 186 days.

(21) Appl. No.: 13/581,372

(22) PCT Filed: Mar. 25, 2010

(86) PCT No.: PCT/EP2010/053950
§ 371 (c)(1),
(2), (4) Date: Nov. 13, 2012

(87) PCT Pub. No.: WO2011/103931
PCT Pub. Date: Sep. 1, 2011

(65) Prior Publication Data
US 2013/0064544 A1 Mar. 14, 2013

(30) Foreign Application Priority Data
Feb. 25, 2010 (EP) .................... 10154671

(51) Int. Cl.
H04L 12/819 (2013.01)
H04J 14/02 (2006.01)
H04L 12/721 (2013.01)
H04L 12/433 (2006.01)

(52) U.S. Cl.
CPC ........... *H04L 47/215* (2013.01); *H04J 14/0269* (2013.01); *H04J 14/0213* (2013.01); *H04J 14/0257* (2013.01); *H04J 14/0205* (2013.01); *H04J 14/0212* (2013.01); *H04J 14/0221* (2013.01); *H04J 14/0267* (2013.01); *H04L 45/62* (2013.01); *H04J 14/0275* (2013.01); *H04L 12/433* (2013.01); *H04J 14/0204* (2013.01)
USPC ............................. 398/58; 398/59

(58) Field of Classification Search
CPC ...... H04L 12/433; H04L 45/62; H04L 47/215
USPC ....................................... 398/58, 59
See application file for complete search history.

(56) References Cited

U.S. PATENT DOCUMENTS

| 7,092,633 B2 | 8/2006 | Fumagalli et al. | |
|---|---|---|---|
| 2005/0207427 A1* | 9/2005 | Su et al. ................ | 370/400 |
| 2008/0124081 A1* | 5/2008 | Hamada et al. ............ | 398/59 |

FOREIGN PATENT DOCUMENTS

EP 1 578 048 9/2005

OTHER PUBLICATIONS

James Cai, The Multitoken Interarrival Time (MTIT) Access Protocol for Supporting Variable Size Packets Over WDM Ring Network, Oct. 2000, IEEE Journal on Selected Areas in Communications, vol. 18, No. 10, pp. 2095-2097.*

(Continued)

Primary Examiner — David Payne
Assistant Examiner — Omar S Ismail
(74) Attorney, Agent, or Firm — Baker Botts, LLP

(57) ABSTRACT

A node (260, 50) for a multi-token optical communications network has optical channels between the node and other nodes, each channel having a token (T1, T2, T3), passed between nodes, to indicate that a corresponding optical channel is available for transmission during a token holding time. The node has a transmitter (280) for transmitting packets over the optical channels, a buffer (170, 270) for queuing packets before transmission, and a transmit controller (170, 290) configured to control the buffer to forward an initial packet or packets from the buffer to the transmitter once a token has been received. The transmit controller determines how much of the token holding time remains after the transmission of the initial packet or packets, and then controls the buffer to forward a further packet according to the remaining token holding time. A maximum packet delay can be reduced where there is asymmetric traffic. A token holding time can be different for different nodes.

17 Claims, 21 Drawing Sheets

(56) References Cited

OTHER PUBLICATIONS

Ghizzi, M., et al., "On the Performance of a WDM Ring Network with Multitoken Interarrival Time (MTIT) MAC Protocol," Proc. Noc 2004, Jun. 2004.

International Search Report for PCT/EP2010/053950, mailed Nov. 10, 2010.

Cai, J et al., "The Multitoken Interarrival Time (MTIT) Access Protocol for Supporting Variable Size Packets Over WDM Ring Network", IEEE Journal on Selected Areas in Communications, vol. 18, No. 10, (Oct. 1, 2000), pp. 2094-2104.

Peng, L-M et al., Design and performance comparison of multiple-token based MAC protocols for optical burst switched ring networks, Photonic Network Communications, vol. 15, No. 3, (Nov. 13, 2007), pp. 213-225.

\* cited by examiner

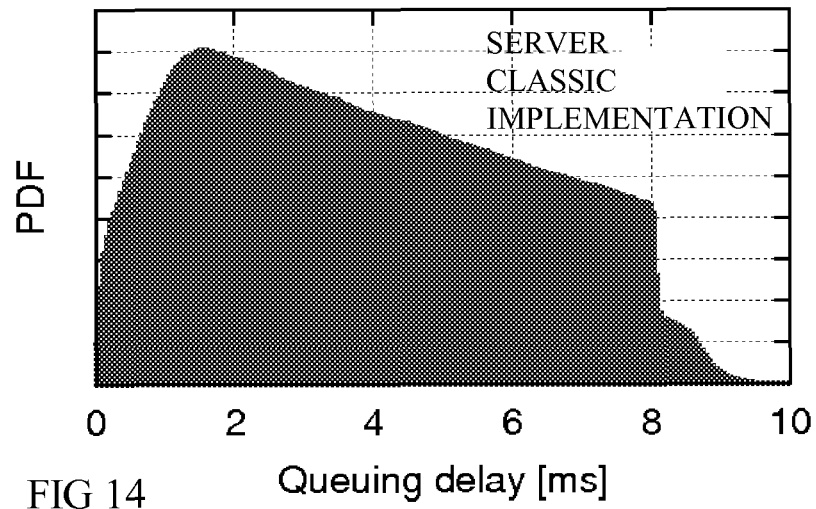
FIG 14
Load = 90%, W = 16, client node
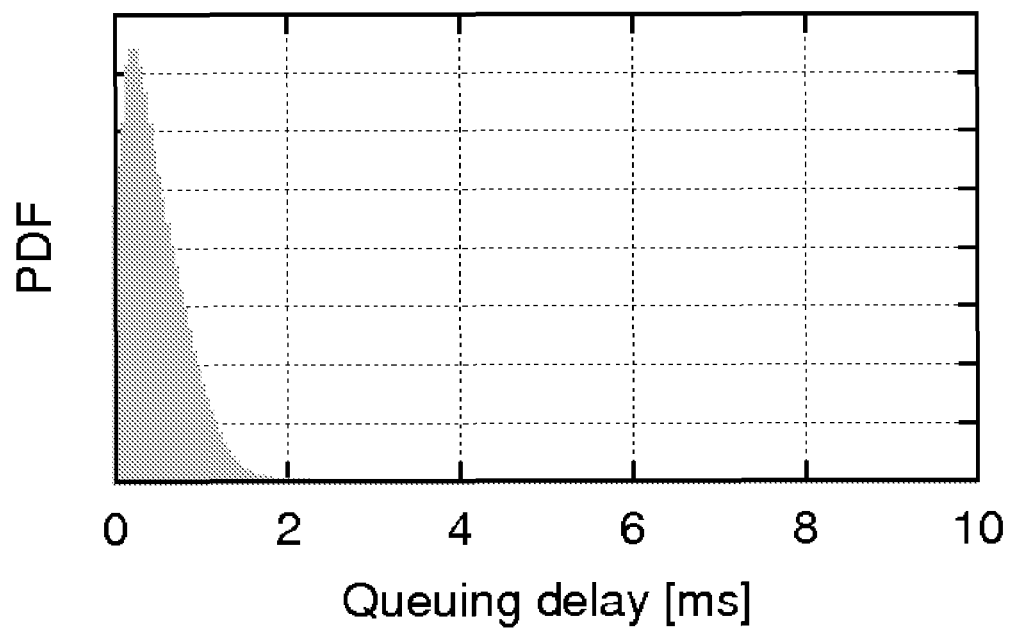
FIG 15  CLIENT CLASSIC IMPLEMENTATION

SERVER
CLASSIC IMPLEMENTATION

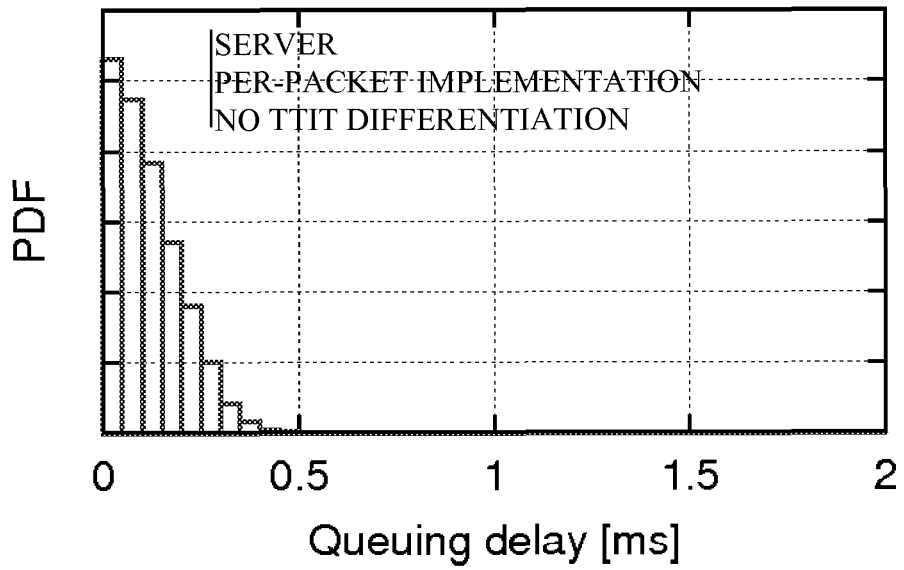
FIG 22
FIG 23
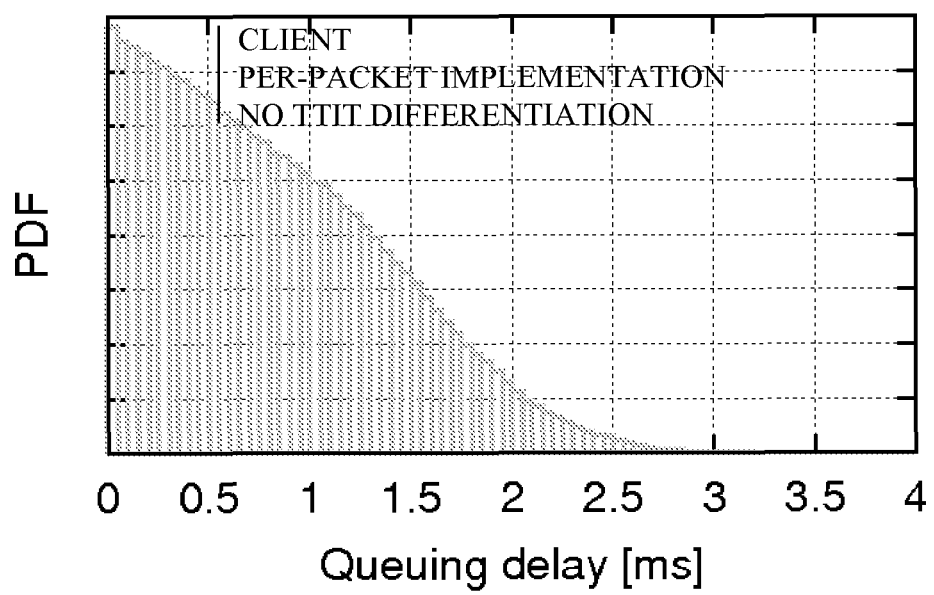

FIG 26
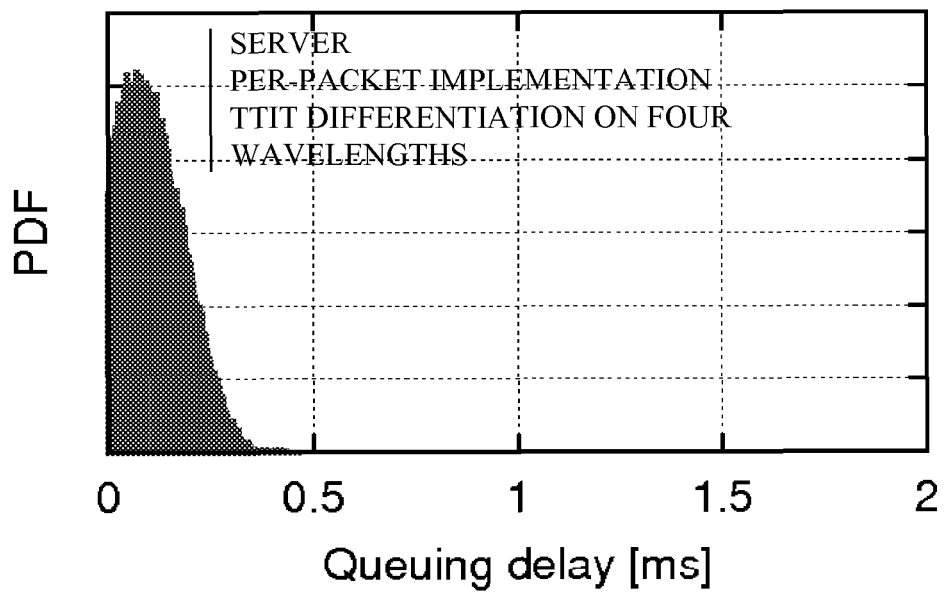
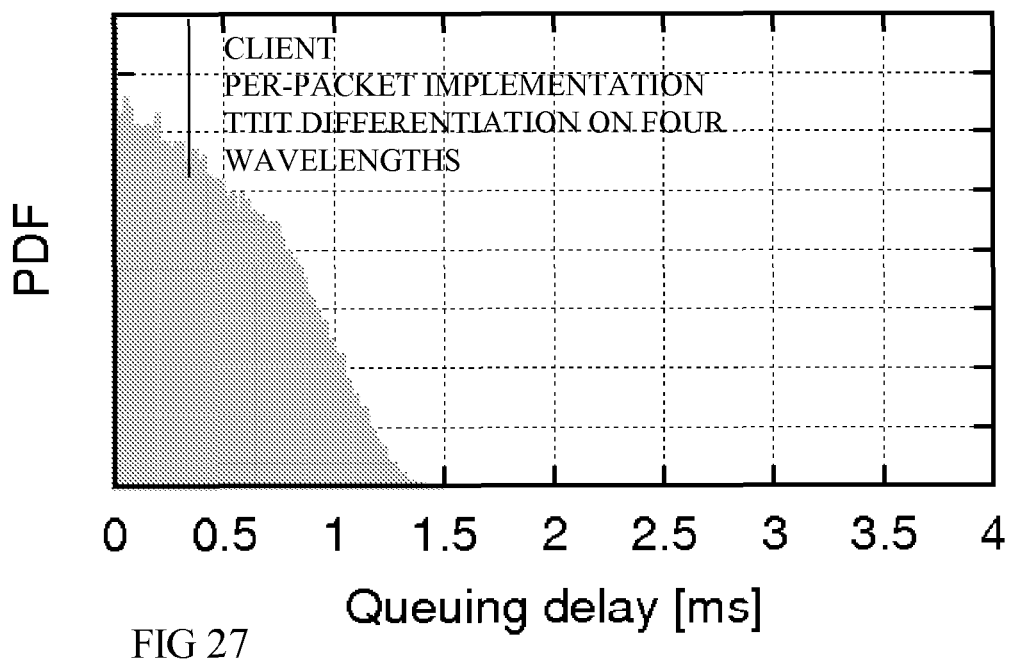
FIG 27

CONTROL OF TOKEN HOLDING IN MULTI-TOKEN OPTICAL NETWORK

This application is the U.S. national phase of International Application No. PCT/EP2010/053950, filed 25 Mar. 2010, which designated the U.S. and claims priority to EP Application No. 10154671.1, filed 25 Feb. 2010, the entire contents of each of which are hereby incorporated by reference.

FIELD OF THE INVENTION

This invention relates to nodes for multi token optical communications networks, to methods of operating such networks, to corresponding programs, and to corresponding optical networks.

BACKGROUND

It is known to provide optical communications networks having multiple nodes coupled by links. Many topologies are conceivable. A ring type of topology has always been the primary choice for fiber-based metropolitan area networks (MAN), because such a topology can help minimize fiber deployment costs, and simplify routing, control, and management issues. Such issues become more important in networks having multiple optical channels such as wavelengths. It is known to provide dynamic routing of such lightpaths through the network to try to match rapid changes in demand. To provide bandwidth on demand a network should have a fast set up time, a fair blocking probability independent of number of spans of a desired path, and a good bandwidth efficiency. Many approaches have been conceived for solving this routing and wavelength assignment (RWA) challenge. They can be categorized as either centralized or distributed approaches. An example of a distributed approach is a token passing scheme to avoid contention for network resources. A particular type of this is a multitoken protocol for networks having multiple optical channels.

As new applications and services such as video on demand (VoD), video broadcasting, and IP telephony, take an increasing share of the capacity, the MAN traffic characteristics, in terms of both required bandwidth and quality of service (QoS) assurance are tending to change. VoD and video broadcasting are characterized by large and strongly asymmetrical bandwidth requirements, because the majority of the traffic takes origin from a video server and is directed downstream to the client nodes. In this context, important QoS constraints include low average and maximum latency. This is due to the fact that even though VoD can tolerate a latency slightly higher than strictly real time traffic thanks to buffering, once in playback that latency must remain confined in tight boundaries in order to avoid buffer overflow or starvation. It is likely that such video-related traffic will exceed best effort traffic in terms of required bandwidth, hence the interest of many network operators to effectively accommodate QoS traffic in their MANs.

Given this context, multi-token protocols for WDM optical packet ring have good characteristics of flexibility and performance to support the requirements of QoS sensitive traffic. In multi-token rings, the time is not slotted. For each wavelength channel, there is a special control packet, i.e., the token, which travels around the ring, allowing exclusive access to the given optical channel by the node currently holding the token.

As described in more detail in U.S. Pat. No. 7,092,633, multitoken architectures have the advantage of seamlessly supporting variable length packets and guaranteeing both fairness and bounded latency, thanks to the limited token holding time. Notably to handle on demand traffic, such as VoD, such multitoken architectures can help enable a good balance between the three requirements of fast set up time for optical connections or lightpaths, fair blocking probability and good bandwidth efficiency.

SUMMARY OF THE INVENTION

An object of the invention is to provide improved apparatus or methods. According to a first aspect, the invention provides:

A node suitable for a multi-token optical communications network, the network having optical channels between the node and other nodes, the network being arranged so that nodes hold and pass unique tokens, each token indicating to a node that a corresponding one or more of the optical channels is available for transmission while that node holds that token, during a token holding time. The node comprises a transmitter for transmitting packets to the other nodes over the optical channels, a buffer for queuing packets before transmission by the transmitter, and a transmit controller. This controller is configured to control the buffer to forward an initial packet or packets from the buffer to the transmitter once a token has been received, according to a token holding time, for transmission over an optical channel corresponding to the token. It is also configured to determine how much of the token holding time remains after the transmission of the initial packet or packets, and then control the buffer to forward a further packet or packets from the buffer to the transmitter according to the remaining token holding time.

Compared to forwarding all the packets to the transmitter in one go, by having a later determination of whether to forward further packets, this can reduce a maximum packet delay. In particular it leaves the further packets in the queue open to be transmitted earlier on other optical channels if other tokens are received during the first part of the token holding time, indicating that other optical channels are available. This can spread the packets over different optical channels and thus fill the available channels more quickly, and thus make better use of available capacity. This also results in less risk of packets being received at their destination out of sequence. There is a cost of more effort to recalculate the remaining token holding time more frequently.

Any additional features can be added to those discussed above, and some are described in more detail below.

Another aspect of the invention can involve a method of operating a multi-token optical communications network the network having optical channels between the node and other nodes, the network being arranged so that nodes hold and pass unique tokens, each token indicating to a node that a corresponding one or more of the optical channels is available for transmission while that node holds that token, during a token holding time. The method has steps of queuing packets in a buffer before transmission, and controlling the buffer to forward an initial packet or packets from the buffer to a transmitter for transmitting packets to the other nodes over the optical channels, once a token has been received, according to a token holding time, for transmission over an optical channel corresponding to the token. A further step is determining how much of the token holding time remains after the transmission of the initial packet or packets, and controlling the buffer to forward a further packet or packets from the buffer to the transmitter according to the remaining token holding time.

Another aspect provides an optical network having a hub node and client nodes, each of the nodes being suitable for a multi-token optical communications network, the network having optical channels between the nodes, the network being arranged so that nodes hold and pass unique tokens, each token indicating to a node that a corresponding one or more of the optical channels is available for transmission while that node holds that token, during a token holding time. The hub node comprises a transmitter for transmitting packets to the other nodes over the optical channels, a buffer for queuing packets before transmission by the transmitter, and a transmit controller configured to control the buffer to forward an initial packet or packets from the buffer to the transmitter once a token has been received, according to a token holding time, for transmission over an optical channel corresponding to the token. The transmit controller is also configured to determine how much of the token holding time remains after the transmission of the initial packet or packets, and then control the buffer to forward a further packet or packets from the buffer to the transmitter according to the remaining token holding time and the hub node is arranged to have a different token holding time than the token holding time for the other nodes on at least some of the optical channels. Another aspect provides a method of operating a multi-token optical communications network the network having optical channels between a first node and other nodes, the network being arranged so that nodes hold and pass unique tokens, each token indicating to a node that a corresponding one or more of the optical channels is available for transmission while that node holds that token, during a token holding time. The method comprises at the first node queuing packets in a buffer before transmission, controlling the buffer to forward an initial packet or packets from the buffer to a transmitter for transmitting packets to the other nodes over the optical channels, once a token has been received, according to a token holding time, for transmission over an optical channel corresponding to the token. The first node uses a different token holding time than the token holding time of the other nodes for at least some of the optical channels.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 12 to 27 show graphs of operating characteristics of nodes according to embodiments.

DETAILED DESCRIPTION

Figure 1:
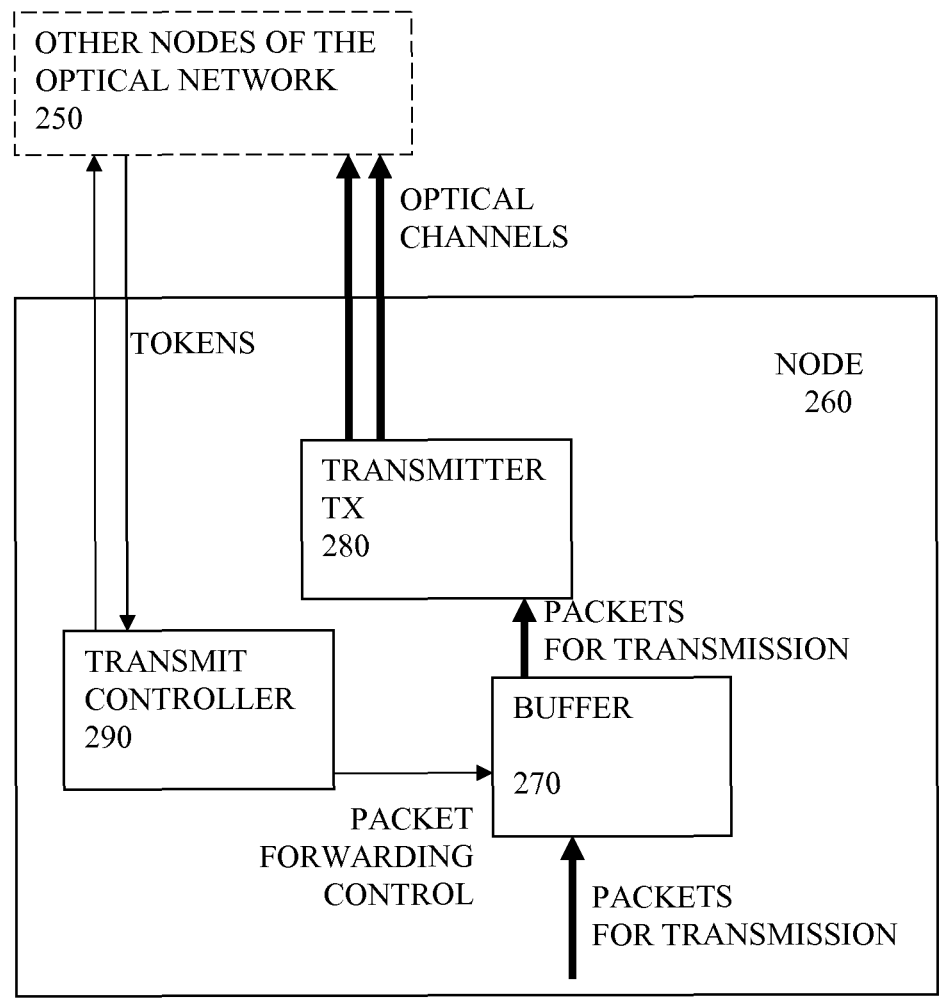
FIG. 1 shows a schematic view of a node according to a first embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Definitions

Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of node, not limited to the types described, not limited to any level of integration, or size or bandwidth or bit rate and so on.

References to packets can encompass any kind of packet with or without a header, of any size fixed or variable size and so on.

References to software can encompass any type of programs in any language executable directly or indirectly on processing hardware. References to computer readable media are not intended to encompass non tangible transitory signals during transmission.

References to hardware, processing hardware or circuitry can encompass any kind of logic or analog circuitry, integrated to any degree, and not limited to general purpose processors, digital signal processors, ASICs, FPGAs, discrete components or logic and so on.

References to rings as topologies are intended to encompass topologies having a physical ring and topologies having logical rings, in other words any topology in which the tokens can be passed around all the nodes, including for example linear, or star or, tree topologies or mixtures of these, or other physical topologies.

Abbreviations

MTIT=Multi Token Inter-arrival Time (Access Protocol)
TIAT=Token Inter-Arrival Time
TTIT=Target Token Inter-arrival Time Introduction to the Embodiments By way of introduction to the embodiments, some issues with conventional designs will be explained. If the traffic over the network is predominantly video on demand or similar highly asymmetrical and delay-sensitive traffic, then the use of conventional multi-token protocols raises several issues. In particular, if the channel access depends only on a fixed network-wide design parameter, called a multi-token interarrival time (MTIT), this can result in impaired performance when the traffic is not uniformly distributed among ring nodes. On the one hand, nodes generating a high amount of traffic tend to queue many packets in the transmission buffers, causing widely spread access delay distributions. On the other hand, nodes downstream of a node generating a high amount of traffic tend to experience high access delays too, because they typically wait for tokens for a long time and because the tokens arrive late, these downstream nodes can exploit them for a shorter time.

These latency and unfairness issues in multi-channel optical packet rings with multi token medium access control under asymmetrical traffic can be addressed by embodiments of the invention as will be described in more detail. In some embodiments the specification of the buffer queue implementation helps enable these issues to be addressed. In some embodiments a token holding time is different for different nodes. This can be implemented by a table provided in each node to regulate the holding time of each token, based on the node type and on the channel (for example wavelength) associated with that token.

To enable better understanding of features of the embodiments, some conventional features will be discussed first. An example of a single-fiber unidirectional WDM ring network that connects a number of nodes through W data channels will be used, though other examples can be envisaged. Each node is equipped with W fixed-tuned transmitters and W fixed-tuned receivers in this example, though conceivably there may be a number of tunable transmitters instead or in combination. The architecture allows each node to transmit and receive packets independently and simultaneously on any data channel. An input buffer is provided at every node to queue the incoming packets prior to their transmission.

Figure 5:
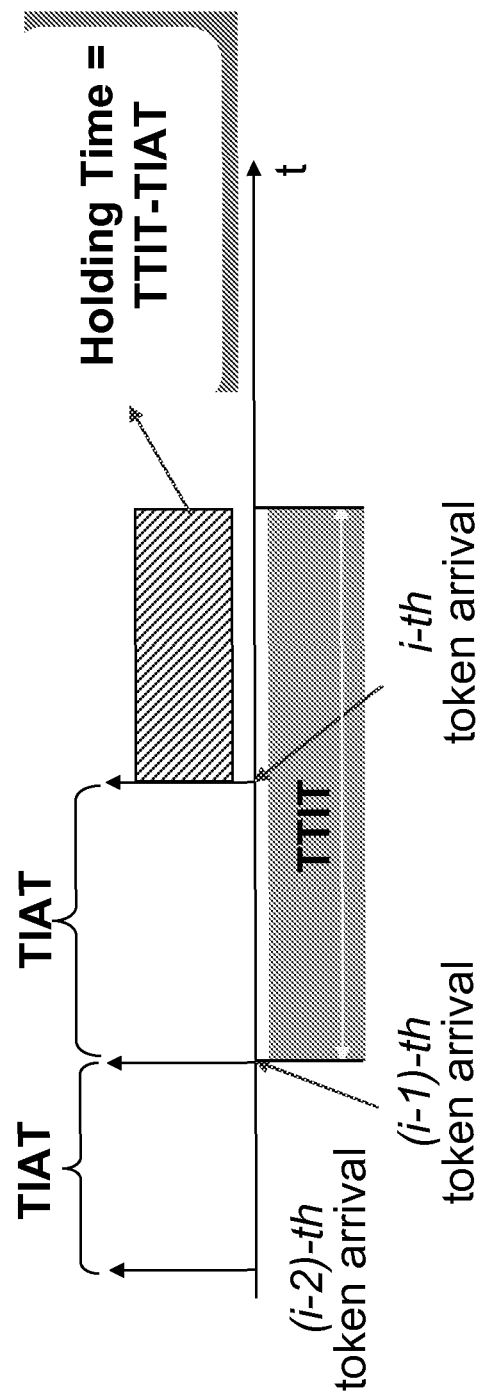
FIG. 5 shows a timing diagram showing a target and actual inter arrival time, where the actual arrival time is early.
Figure 6:
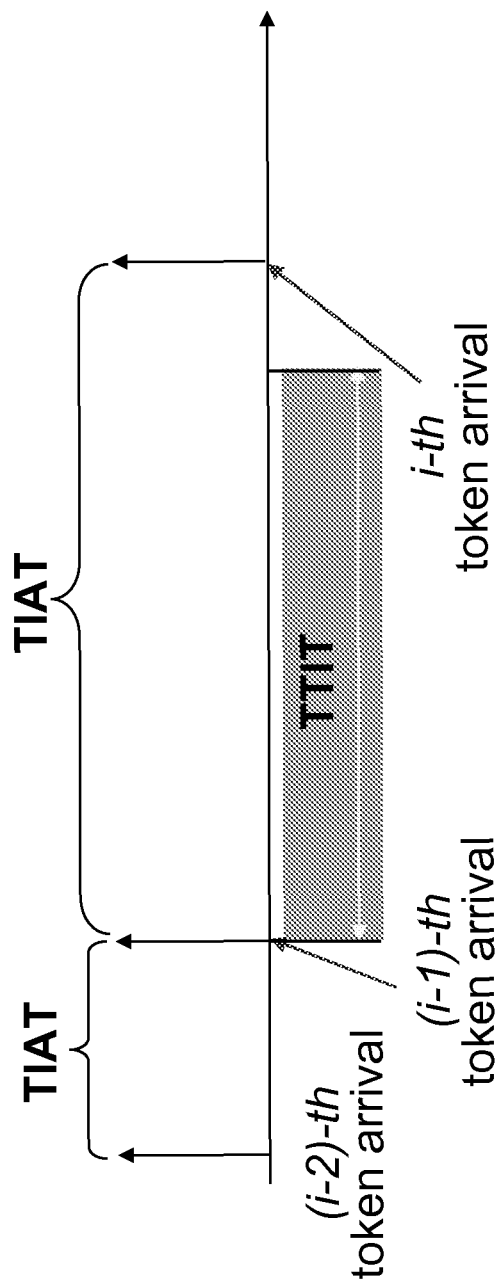
FIG. 6 shows a timing diagram showing a target and actual inter arrival time, where the actual arrival time is late.

FIGS. 5 and 6, Token Interarrival Time

The Multi-Token Interarrival Time (MTIT) protocol is a token-based access scheme designed for the aforementioned ring architecture [see ref CaiJSAC00, J. Cai, A. Fumagalli, and I. Chlamtac, "The multitoken interarrival time (MTIT) access protocol for supporting variable size packets over WDM ring network,", IEEE JSAC, vol. 18, no 10, pp: 2094-2104, October 2000]. Each of the W data channels is associated with one token, which circulates among the nodes on the control channel. Each node is allowed to send its own burst of traffic on a given data channel when holding the corresponding token. The MTIT protocol determines the holding time of a token based on a system parameter called Target Token Interarrival Time (TTIT).

A second parameter called the token interarrival time (TIAT), is defined as the time elapsed between two consecutive token arrivals at the node. Upon a token arrival, the node is allowed to hold the token for a period of time equal to TTIT−TIAT, as shown in the time chart of FIG. 5. In this figure, three token arrival times are shown, for the i-th token, the (i−1)-th token and the (i−2)-th token, meaning there are two token inter arrival times TIAT. The i-th token arrives early enough that there is some time left before the target holding time TTIT for this token expires. In classical MTIT [see ref CaiJSAC00 for more details], as soon as the token arrives, the holding time is computed using the above relation, shown by the diagonal hashed part in FIG. 5, and a corresponding number of packets are removed from the incoming queue to become part of the transmission burst. A token can also be released earlier if no more packets are left in the node's transmission buffer. If the token is late according to the protocol policy (TIAT>TTIT), the node cannot hold it, as shown in FIG. 6. Note that concurrent transmissions on distinct channels are possible at the same node when two or more tokens are simultaneously held at the node. Indeed the nodes are provided with the capability of managing the concurrent transmission of traffic on different WDM channels. A unique feature of MTIT, experienced under almost uniform traffic, is its capability to achieve and maintain an even distribution of the token position along the ring [see ref Castoldi04, P. Castoldi and M. Ghizzi, "On the performance of a WDM ring network with multitoken interarrival time (MTIT) MAC protocol," in Proc. NOC 2004, June 2004]. As a result, the variance of the token inter-arrival time is low, guaranteeing to every node a consistent channel access delay.

Nevertheless under highly asymmetrical traffic, e.g. where much of the traffic flows in a hub-and-spoke manner, classical MTIT can experience high queuing delay especially in a node where a video on demand server is coupled to the network for example. Such a node can be called a server node or a hub node. The embodiments have features which can improve the ring access protocol.

Figure 2:
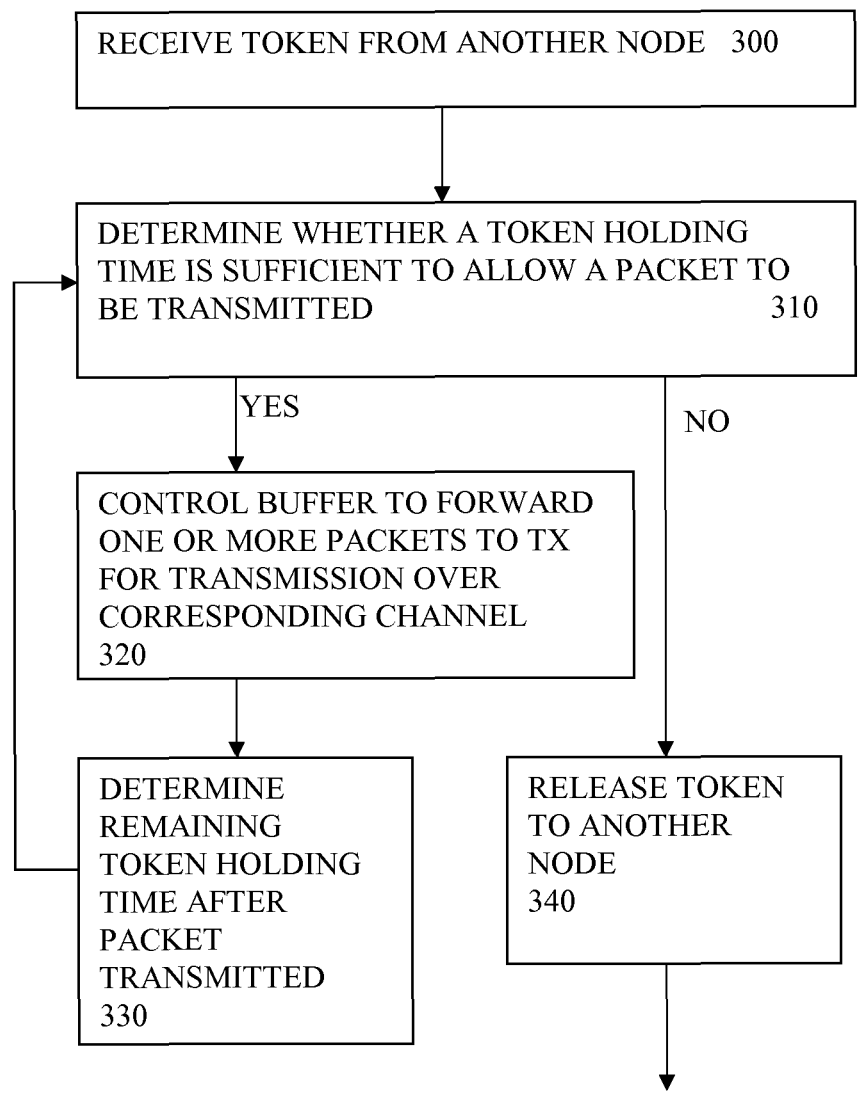
FIG. 2 shows steps according to an embodiment.

FIGS. 1, 2, Embodiments Having Per Packet Token Hold Time Determination:

FIG. 1 shows a schematic view of major parts of a node 260 of an embodiment. There may be many other parts. The node is coupled to other nodes 250 of the optical network by optical channels for the data traffic and by a path for tokens to be passed between nodes to control which of the nodes transmits on a given optical channel. The path for the tokens can be one of the optical channels or can be a separate physical path. The node has transmitters Tx 280 for each of the optical channels, a buffer 270 for queuing packets to be transmitted, and a transmit controller 290 coupled to the buffer to provide queue management using packet forwarding control signals to control when and how many packets are forwarded to the transmitter for transmission.

Packets entering the network at one node, for transmission to another of the nodes are queued in the buffer at the ingress node. Queue management by the transmit controller is a primary issue, to reduce queuing delay, especially at a server node, which is typically much more congested than client nodes. Since it may happen that the congested node simultaneously holds many tokens, according to this embodiment, the queue in the buffer is managed so that not all the packets in the queue are delivered to the first available channel of the transmitter (where availability is indicated by arrival of a token with a holding time greater than zero). Instead, just one packet or a small number of packets are delivered, then the token holding time is determined again to see if there is sufficient token holding time left. Each packet is removed from the input buffer at transmission time, without being previously assigned to a certain token.

FIG. 2 shows steps taken by the transmit controller according to various embodiments. In FIG. 2, the token holding time is determined repeatedly. FIG. 2 starts with receipt of a token from another node at step 300. The transmit controller then determines whether a token holding time is sufficient to allow a packet to be transmitted at step 310. If not then the token is released to another node at step 340. Of course if there are no packets in the buffer then the token is released. If there is a packet in the buffer and there is sufficient token holding time, then at step 320, control signals are sent to the buffer to forward one or more packets to the transmitter for transmission over the optical channel corresponding to the token, using up some of the token holding time. At step 330, a remaining token holding time is calculated or estimated. This can be implemented in various ways, for example the transmitter could signal to the transmit controller when transmission is completed, or a duration could be estimated based on the size of the packet or packets for example. Then step 310 is repeated, to determine if there is sufficient token holding time left to allow another packet to be transmitted, and so on.

Some Additional Features of Embodiments

Some additional features of some embodiments and their significance will now be discussed, many others can be conceived. One such additional feature is the transmit controller being configured to determine the remaining token holding time for each packet. This can help reduce the maximum delay time further. Another such additional feature is the transmit controller being configured to receive a further token, corresponding to another one or more of the optical channels, and to control the buffer to forward another one or more of the packets from the buffer to the transmitter, according to a current token holding time in respect of the further token, for transmission over the another one or more of the optical channels, the transmitter being arranged to transmit the another one or more of the packets at the same time as the transmission of the initial packet or packets. Again this can help enable the maximum delay time to be reduced.

Another such additional feature is the transmit controller being configured to determine the token holding time according to an interval between successive arrival times of different tokens arriving at the node. This is one way to enable fair sharing of the access time to each optical channel between the different nodes.

Another such additional feature is the transmit controller being configured to determine the token holding time to have a dependency on the optical channel corresponding to the token. This can enable different optical channels to be prioritized for control of load balancing, or to enable some channels to be kept free for higher priority traffic for example.

The dependency of token holding time on the optical channel can be arranged to provide preferential access to one or more of the optical channels by the node, compared to others of the nodes. This can help avoid congestion in a network with highly asymmetric traffic.

The transmit controller can be configured to select which of the packets in the buffer to forward as the initial or the further packet or packets, according to a size of the packet and according to the token holding time or the remaining token holding time. This can help enable better use of available transmission time.

The transmit controller can be arranged to estimate a transmission duration of the forwarded packet or packets, and to determine the remaining token holding time according to the estimated transmission duration. This can provide faster operation than waiting for a measurement of the transmission time.

The optical channels can be different optical wavelengths, and the transmitter can have multiple optical sources arranged to transmit different packets on different wavelengths simultaneously. This is a particularly useful level of gradation of channels, though others are possible, such as by polarization, or by any kind of optical coding for example.

Figure 3:
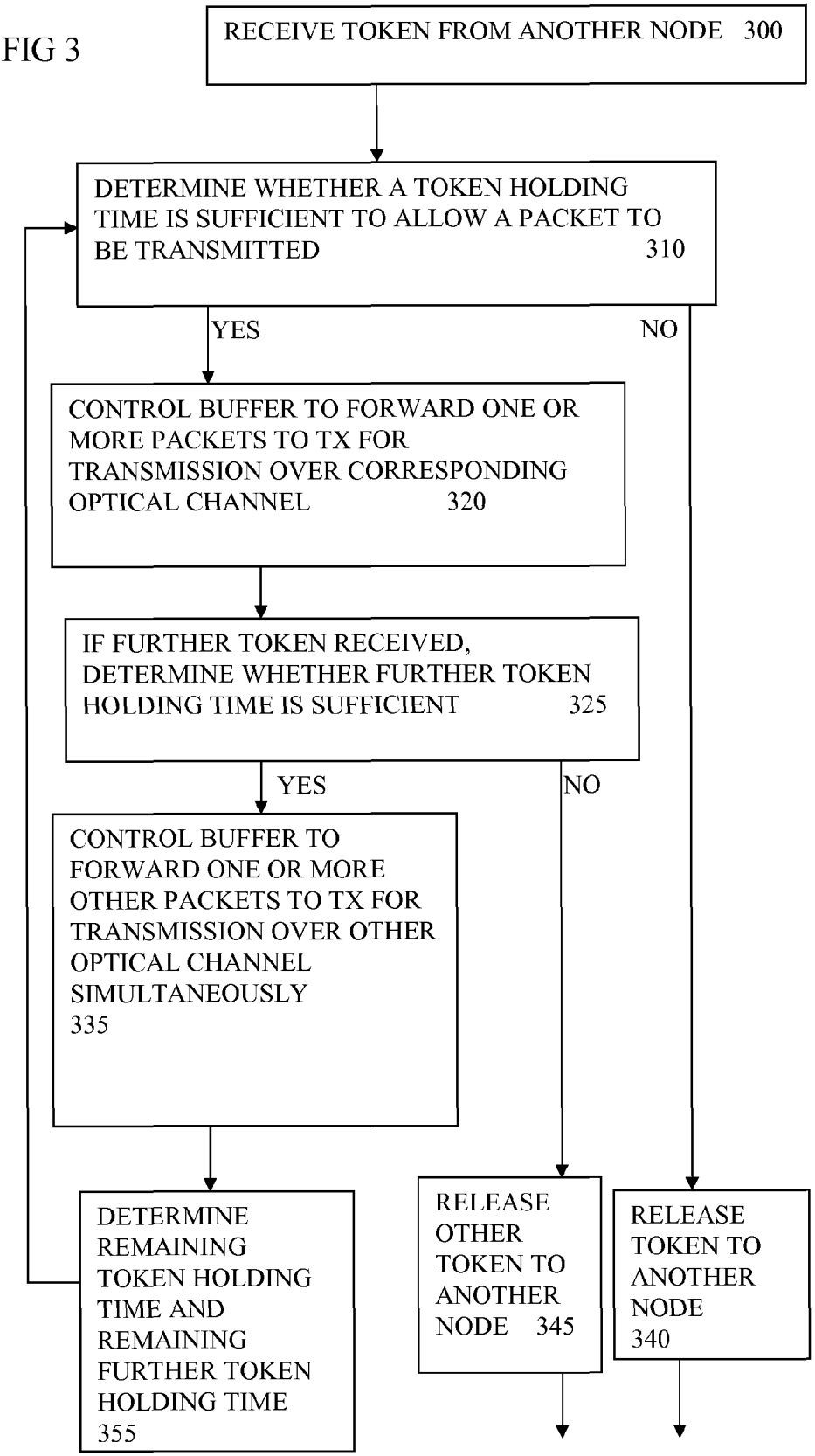
FIG. 3 shows steps according to a further embodiment, where a further token is received.
Figure 4:
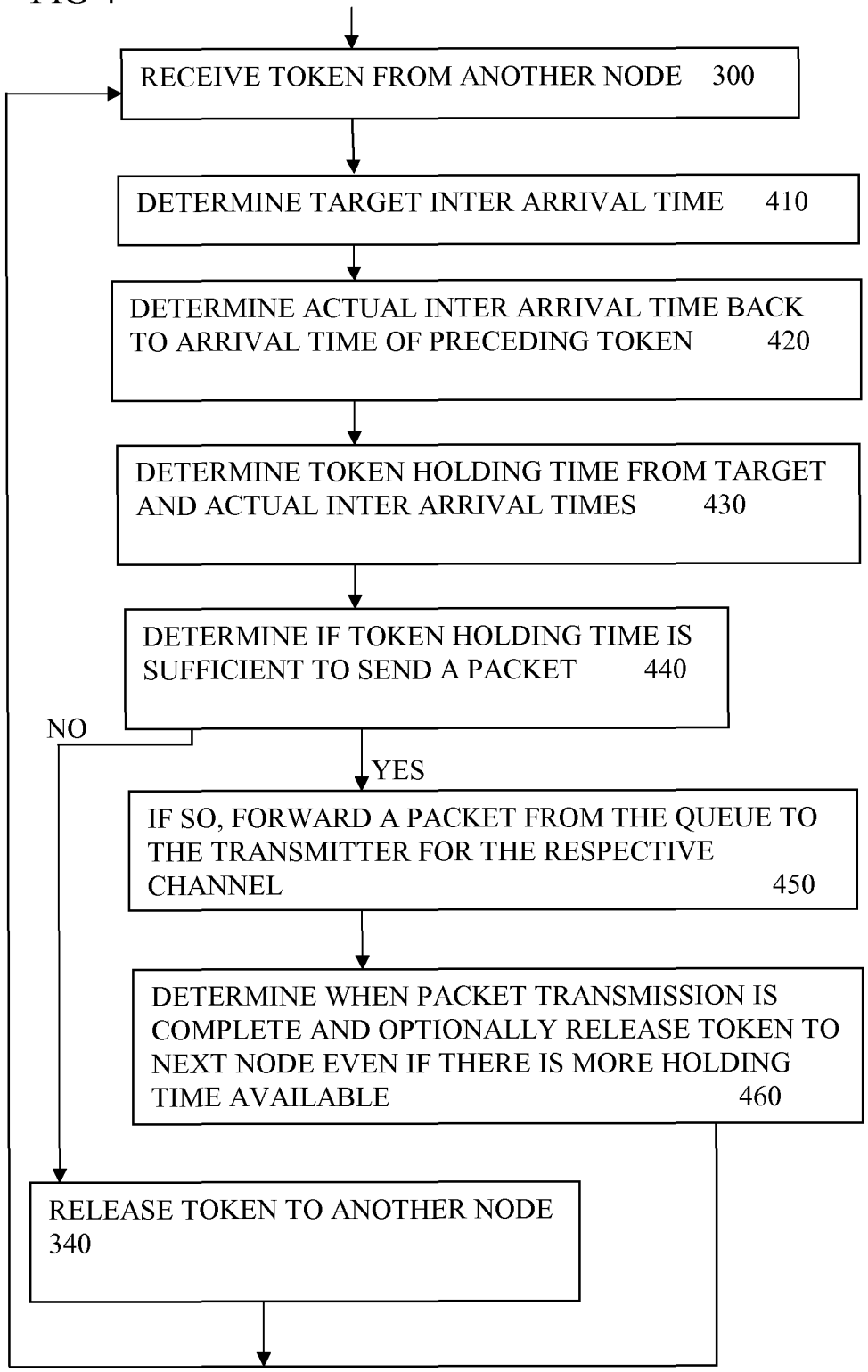
FIG. 4 shows steps according to a further embodiment, where token holding time is determined from target and actual inter arrival times.

FIGS. 3, 4 Further Embodiments Having Per Packet Token Hold Time Determination:

In FIG. 3, additional steps taken by the transmit controller are shown for the case that a further token is received. In FIG. 4, additional steps are shown for an implementation where the token holding time is determined from target and actual inter-arrival times. In FIG. 3, some steps are similar and indicated by the same reference numeral as used in FIG. 2. In this case, a step 325 is shown, where a further token is received during transmission. This further token will correspond to a different one of the optical channels. A token holding time for this further token is determined (referred to as a "further token holding time"), and used to decide whether there is sufficient time to transmit a packet. If not, as before, the further token is released at step 345. Otherwise at step 335, the transmit controller sends control signals to the buffer to cause it to forward one or more other packets to the transmitter for transmission over the corresponding optical channel simultaneously with the transmission of step 320.

At step 355 the remaining token holding time and the remaining further token holding time are determined, and the process is repeated. These can be implemented as separate processes, or separate threads of execution.

In FIG. 4, starts with receipt of a token from another node at step 300. The transmit controller then determines a target inter arrival time at step 410, in some cases by using a look up table according to the optical channel corresponding to the token. At step 420, the actual inter arrival time between the most recently received token and a preceding token is determined. At step 430, the token holding time is determined from the target and actual inter arrival times. At step 440 it is decided if the token holding time is sufficient to send a packet. This may depend on the size of the next packet in the queue. The token is released at step 340 if there is not sufficient time. If there is sufficient time, then a packet is forwarded at step 450 to the transmitter for the respective channel. At step 460, it is determined when the packet transmission is complete and optionally the token is released to the next node even if there is more holding time available. This may be carried out for some but not all of the channels so that some of the tokens move more quickly round the network.

Figure 7:
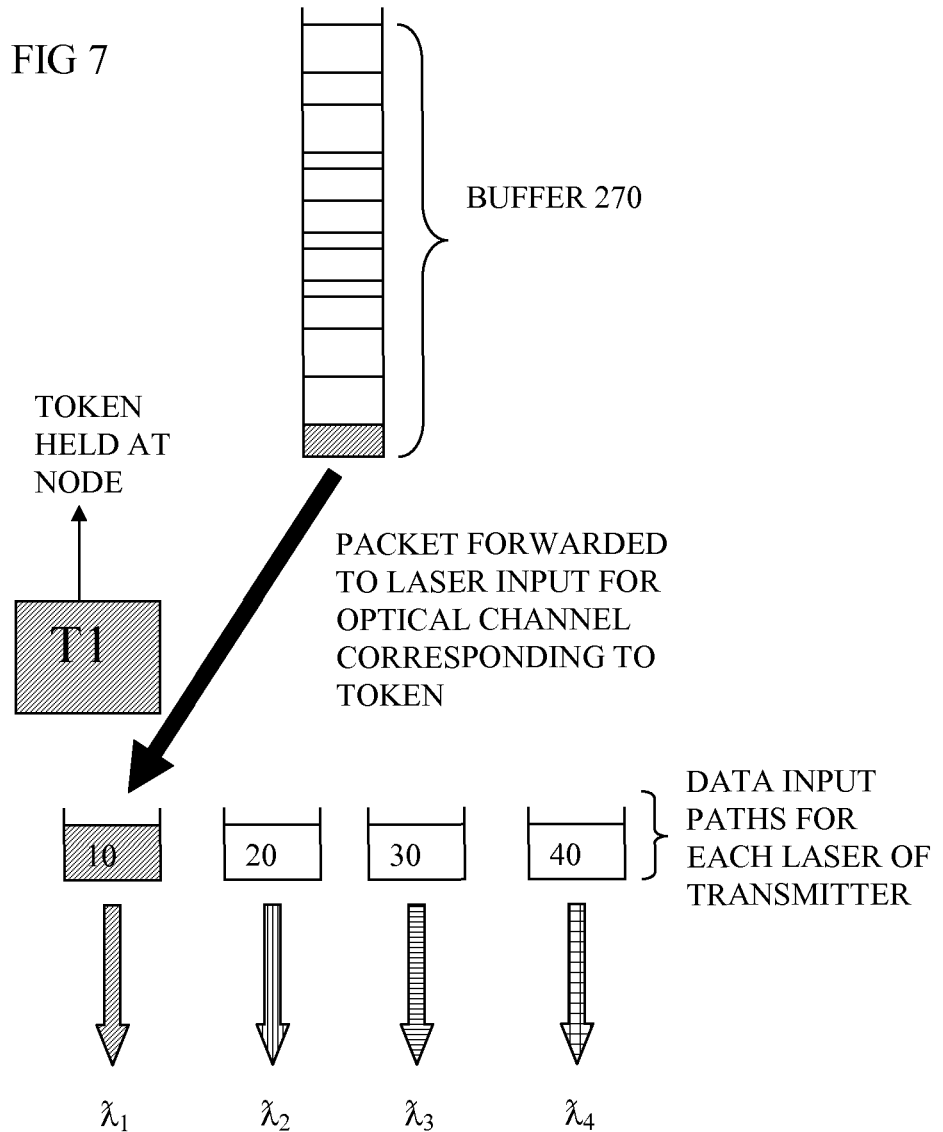
FIG. 7 shows a schematic view of parts of a node according to an embodiment, showing a packet being forwarded to one channel of the transmitter.
Figure 8:
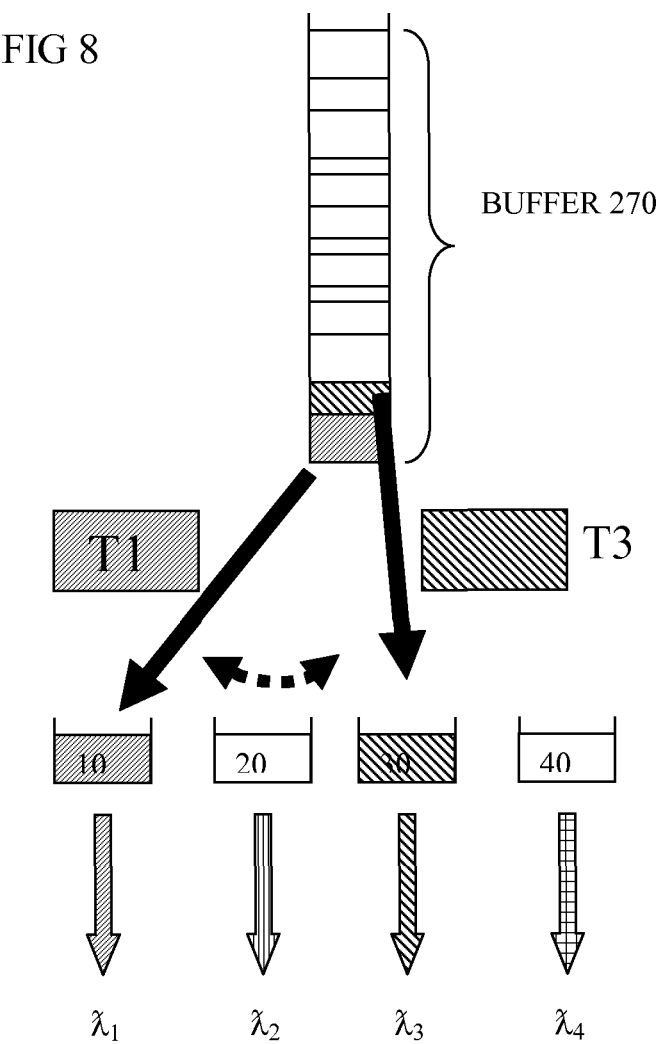
FIG. 8 shows a schematic view of parts of a node according to an embodiment, showing a second packet in the buffer being forwarded to a different one of the channels of the transmitter, for transmission simultaneously with the first, according to an embodiment.
Figure 9:
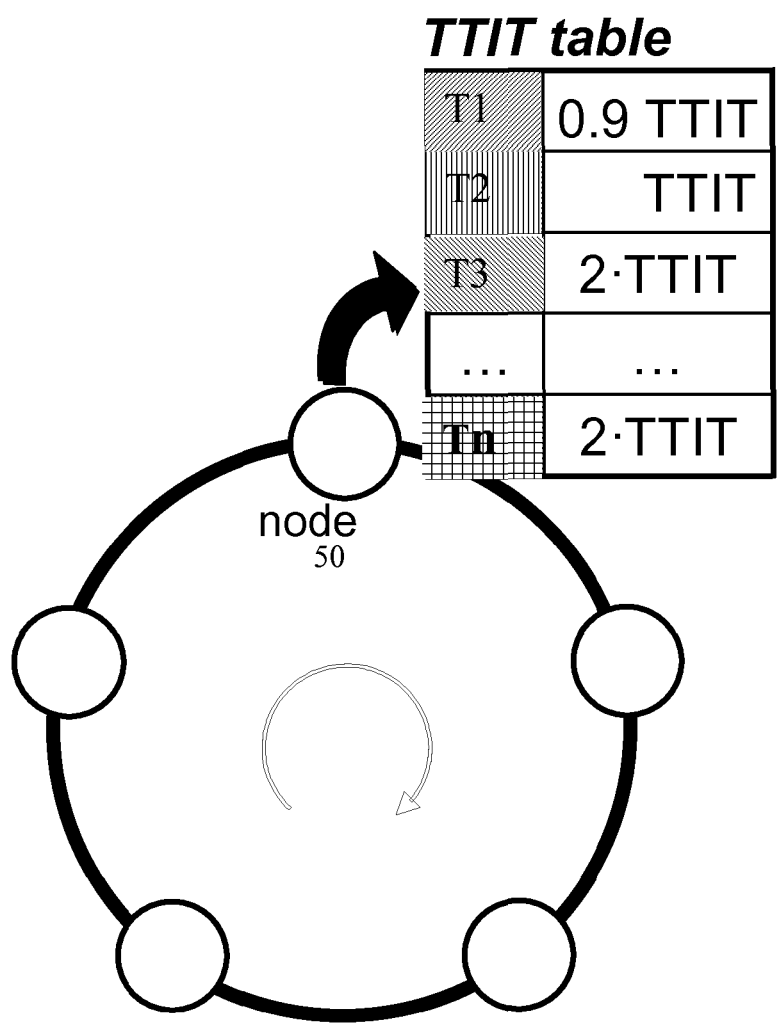
FIG. 9 shows a schematic view of a network having multiple nodes in a ring topology, and showing a node having different target holding times for different optical channels, according to an embodiment.

FIGS. 7 and 8, Per-packet MTIT Implementation

FIG. 7 shows a schematic view of parts of a node according to an embodiment. A buffer 270 is shown for queuing packets to be transmitted to other nodes of the network. When a token T1 is held at the node for sufficient length of time, a packet can be transmitted by one channel of the transmitter. The diagonal shading of the token indicates it corresponds to a first channel or wavelength. So the figure shows a first packet in the buffer being forwarded to the input 10 of the optical transmitter for the first wavelength. Other inputs 20, 30, 40 are shown for the optical transmitters of other channels. These optical transmitters can be fixed wavelength lasers or tunable lasers able to transmit on two or more of the optical channels for example.

FIG. 8 shows a similar view showing the situation when a second token T3 arrives while the first packet is being transmitted. If there is sufficient token holding time for this token, then a second packet in the buffer can be forwarded to a different one of the channels of the transmitter, for transmission simultaneously with the first packet. As T3 corresponds to the third channel or wavelength, this second packet is forwarded to the input 30 of the transmitter for the third wavelength. Both packets can be transmitted simultaneously in contrast to the conventional approach in which the second packet is forwarded to the first channel and has to follow the first packet and is thus delayed longer.

This embodiment can improve on the conventional approach in which at each token arrival, a number of waiting packets fitting the computed token holding time, are removed from the input queue and forwarded to the laser to be placed in the laser's transmission buffer. In the conventional approach, in congested nodes the last packets in the transmission bursts on each wavelength may experience very high delays. In contrast, using queue management of this embodiment, the effective per-packet scheduling avoids long waiting times in the transmission bursts, at the expense of more computational effort to recompute the holding time for each packet transmission, instead of once for each traversed node. Moreover, the per-packet MTIT implementation avoids the risk of large out-of-sequence packet arrivals, which can occur in the conventional implementation when two successive bursts contain consecutive packets destined to the same node. However a small out-of-sequence packet delivery can still occur, if a long packet A is transmitted on wavelength i soon before a short packet B is transmitted on wavelength j: this issue can be overcome by adding a sequence number to the packets to recover the transmission sequence at the destination node.

Figure 10:
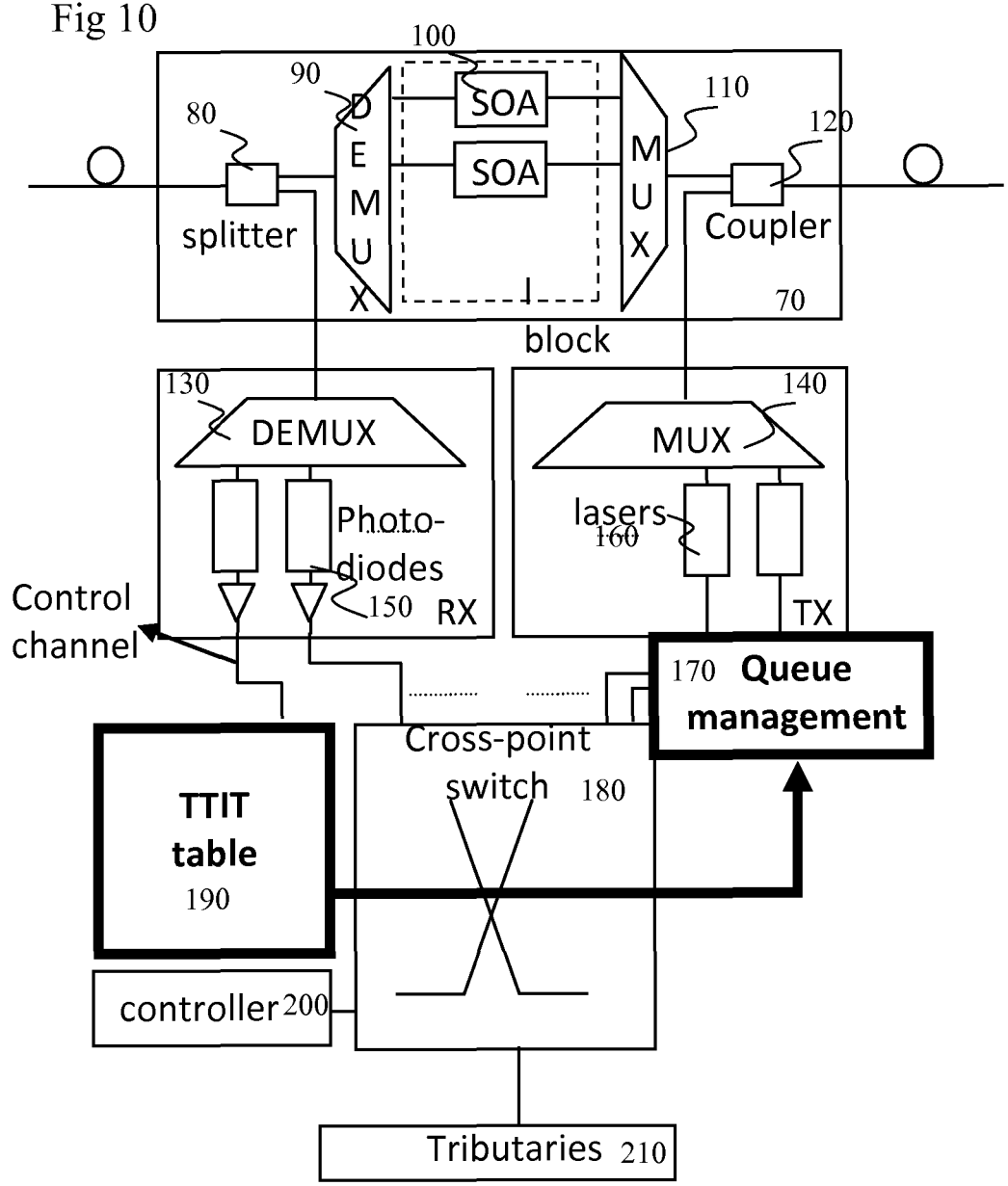
FIG. 10 shows a schematic view of an example of a node according to an embodiment, showing a queue management part.

FIG. 10, Example of a Node

FIG. 10 shows a schematic view of a node according to an embodiment in a WDM type network. Many other examples can be envisaged. The parts of the node subsystems added or improved by the embodiments are highlighted in FIG. 10. An incoming WDM link is shown arriving at a splitter 80 of an optical part 70. Part of the optical power of the incoming WDM signal having multiple wavelengths is dropped at the node and fed to a receiver Rx which has a wavelength demultiplexer part 130. Another part of the power from the splitter is fed to optical amplifiers SOA 100 for pass through. The pass through path has a wavelength demultiplexer 90 followed by an amplifier for each wavelength, and followed by a multiplexer 110. The output of the multiplexer is fed to a coupler 120 where an add signal from a transmitter Tx is coupled in. The transmitter has a number of lasers 160 each for a different channel or wavelength, followed by a wavelength multiplexer 140.

The add and drop paths from the photo diodes and to the lasers are coupled to or from tributaries 210, via a cross point switch 180, to enable any tributary path to be coupled to any of the channels. A queue management part 170 is located between the cross point switch and the Tx part. This includes the buffer for queuing packets and the transmit controller for providing queue management. A subsidiary controller 200 is shown for controlling the cross point switch. A TTIT table 190 is shown coupled to the queue management part.

Figure 11:
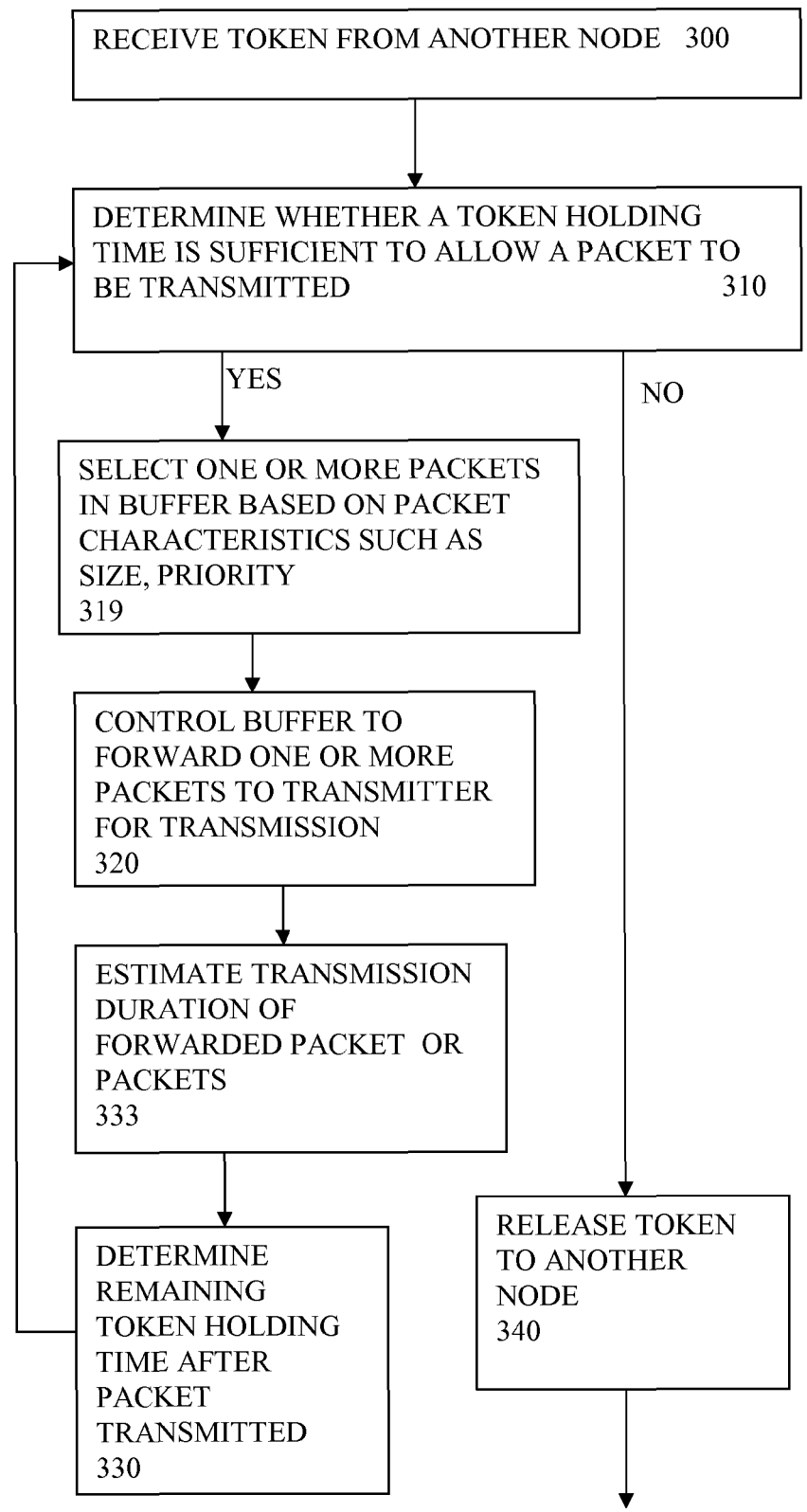
FIG. 11 shows steps according to a further embodiment, where packets in the buffer are selected according to packet characteristics.

FIG. 11,

FIG. 11 shows steps according to another embodiment. This shows some steps similar to those of FIG. 2. In this case, at step 319, the packet to be forwarded is selected rather than just taking the next packet. The selection can be based on packet characteristics such as size, or priority and so on. Thus the packets can effectively be reordered if that enables more efficient transmission to fill time gaps. After the packet is forwarded, at step 333 an estimate is made of transmission duration, before determining a remaining token holding time.

FIGS. 12 to 27, Performance Evaluation Graphs

FIGS. 12 to 27 show graphs of various parameters to show the practical significance of some of the features discussed above, for an example network under particular conditions. Similar graphs could be produced for different networks and different conditions. The graphs are based on simulated operations of a unidirectional ring architecture loaded with asymmetrical connection-oriented traffic. The ratio between the number of connections originating from the server node and those originating from a client node is 100:1. The network has a ring topology composed of 11 nodes (1 server and 10 clients), spaced 10 km from each other. Each of W wavelengths has a transmission bit-rate of B=10 Gb/s. Inter arrival times and sizes of the incoming packets of each connection are exponentially distributed. The mean packet size is 500 Bytes. All the simulations are run with a load of 90% of the maximum aggregate ring bandwidth B×W. The default TTIT, i.e., $TTIT_0$, is set to 8.6 ms, which is a minimum value in order to avoid any packet loss and queue instability. If the TTIT differentiation is enforced, the following TTITs have been chosen in each node: the server has a TTIT=0 on the first $W_d$ wavelengths, while $TTIT=2\times TTIT_0$ on all the remaining wavelengths; on the other hand, the client nodes have $TTIT=10\times TTIT_0$ on the first $W_d$ wavelengths, while it is kept unaltered on all the remaining wavelengths. The rationale behind this choice is to reserve a few (i.e., $W_d$) wavelengths to the client nodes in order to avoid excessively delayed tokens, while the heavily loaded server can take full advantage of the remaining wavelengths.

Figure 12:
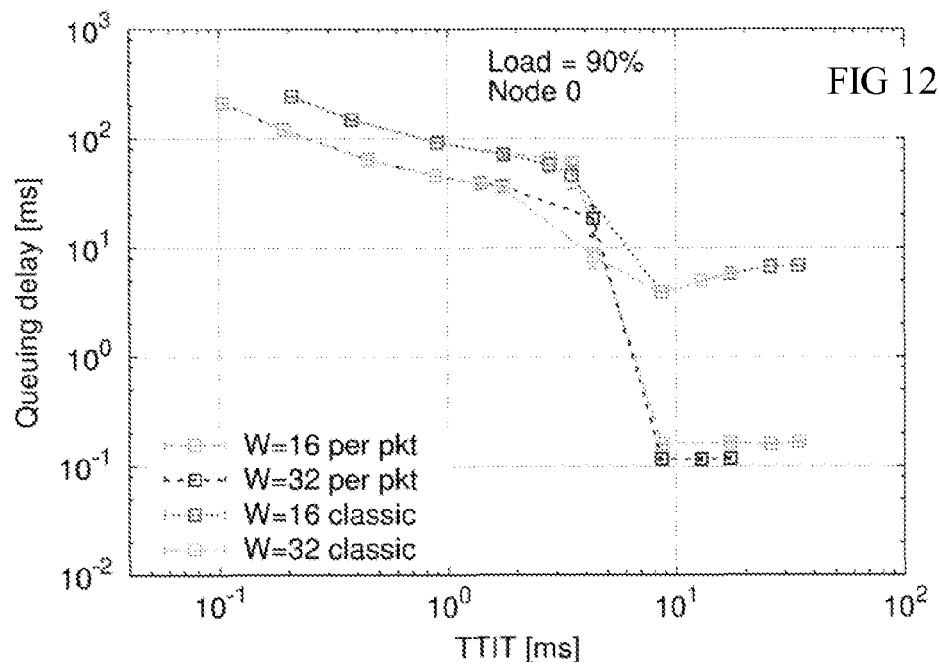
Figure 13:
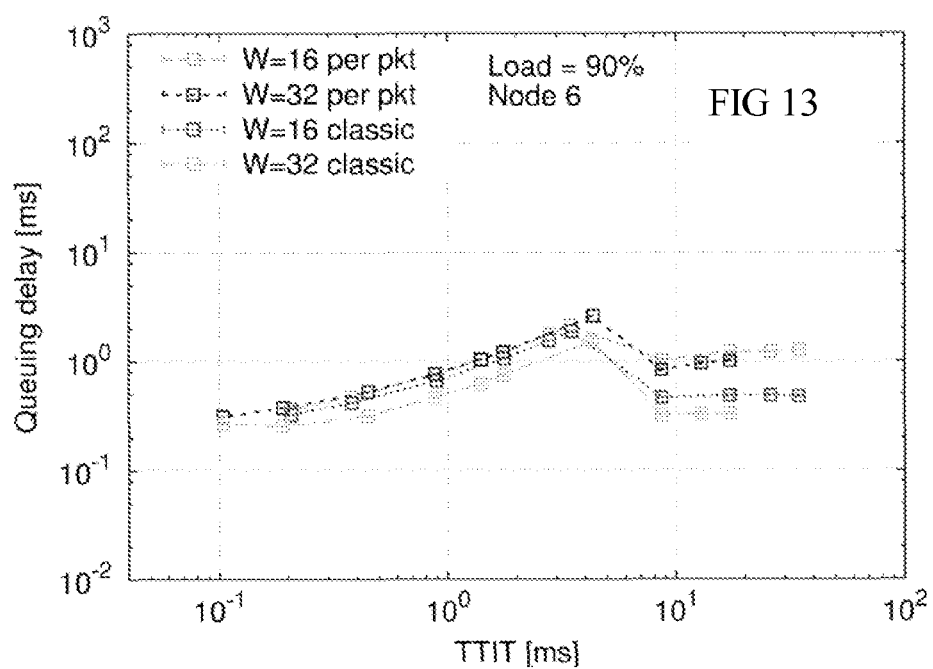

FIGS. 12 and 13 show the average queuing latency versus the TTIT value for the hub node and a client node respectively. In both cases the queue policy according to embodiments, (called "per pkt" in the key) and without it (called "classic" in the key) are compared with W=16 and W=32 wavelengths. It is possible to notice the gain in performance, especially in the hub node, which benefits more of the queue policy due to its heavy load. Even at a load equal to 90%, all latency values for TTIT greater than a threshold are very low.

Figure 16:
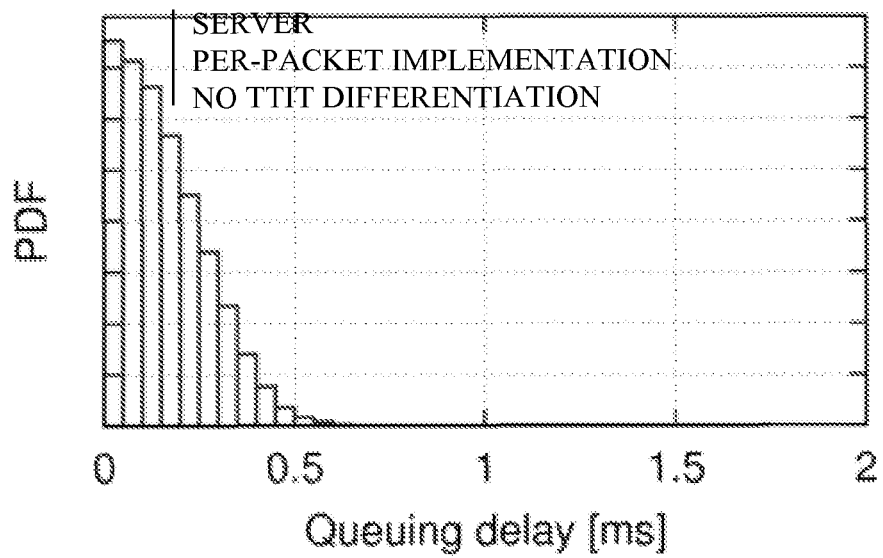
Figure 17:
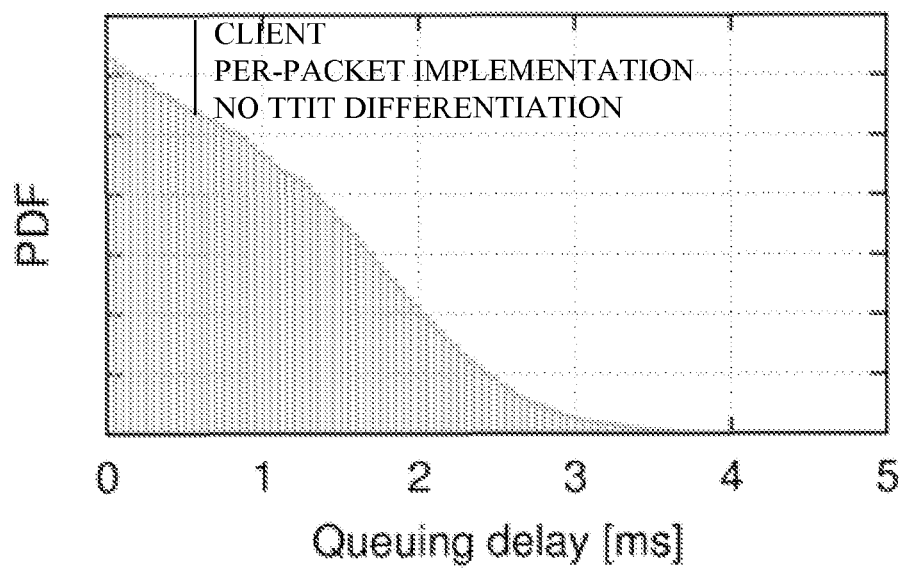
Figure 18:
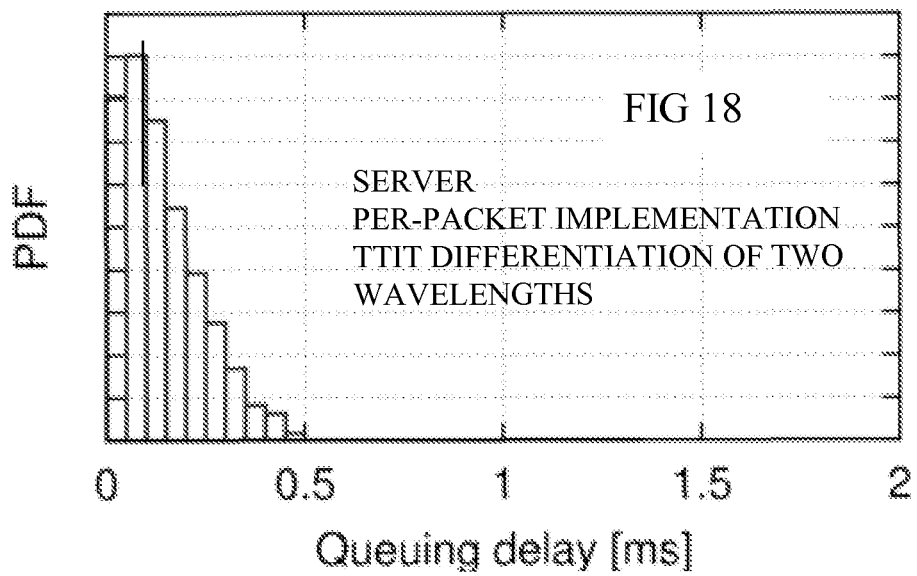
Figure 19:
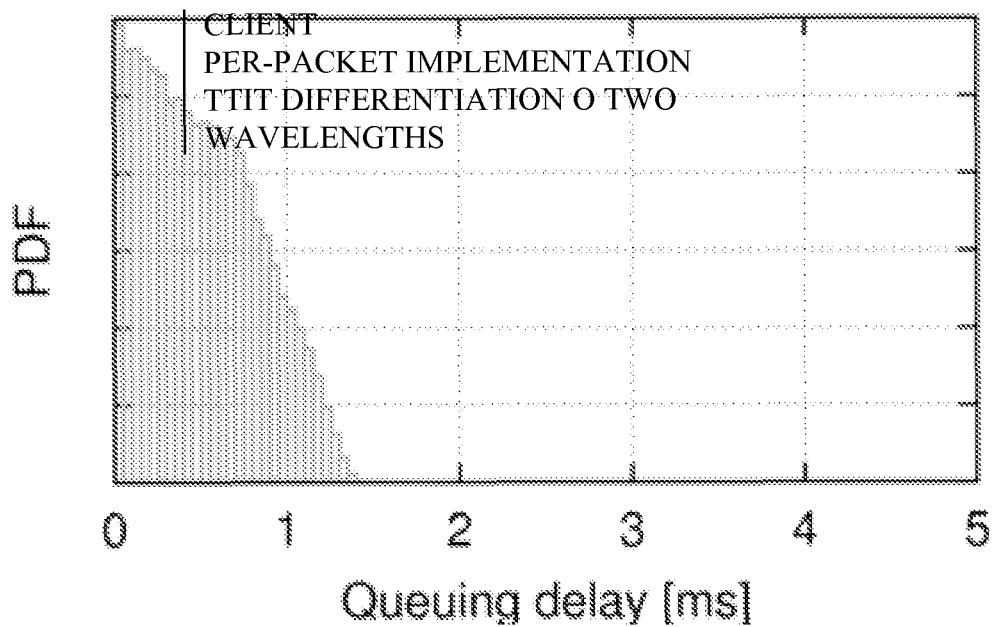
Figure 20:
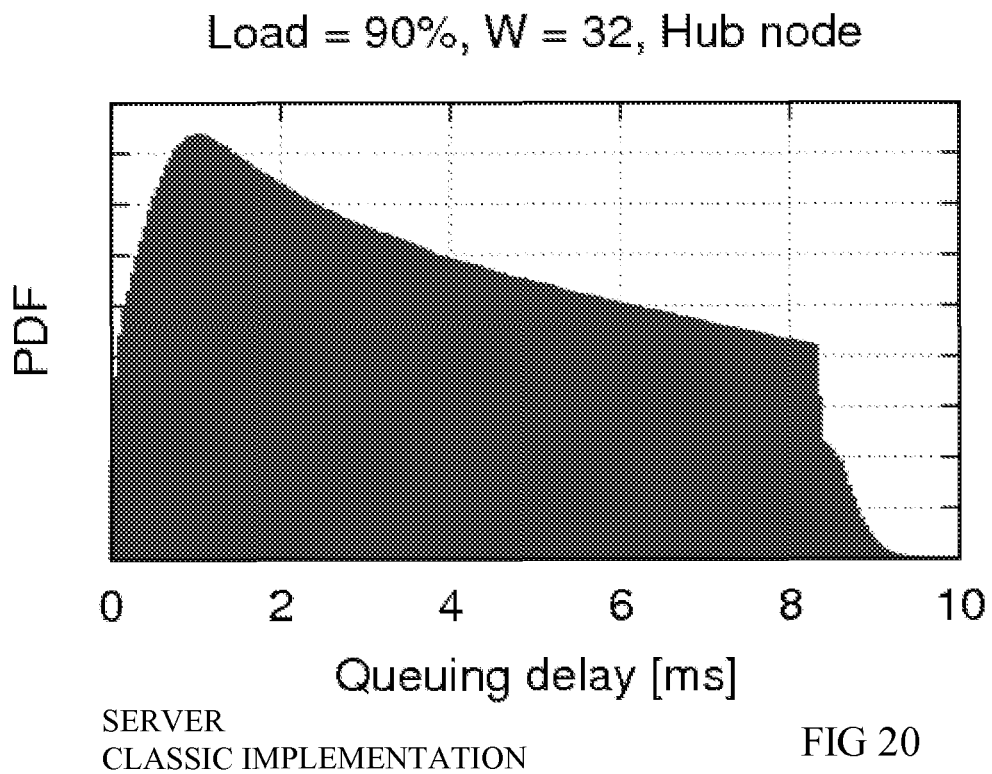
Figure 21:
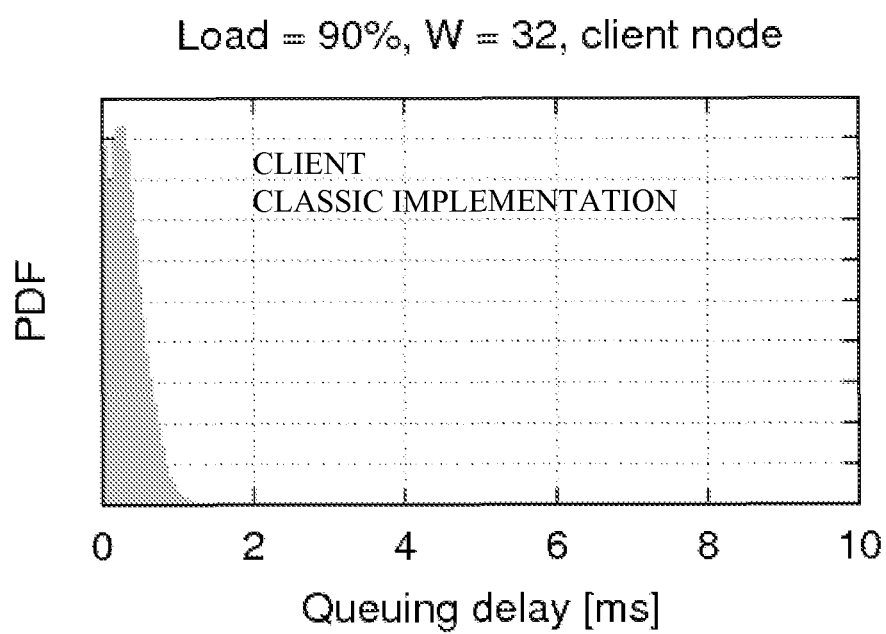
Figure 24:
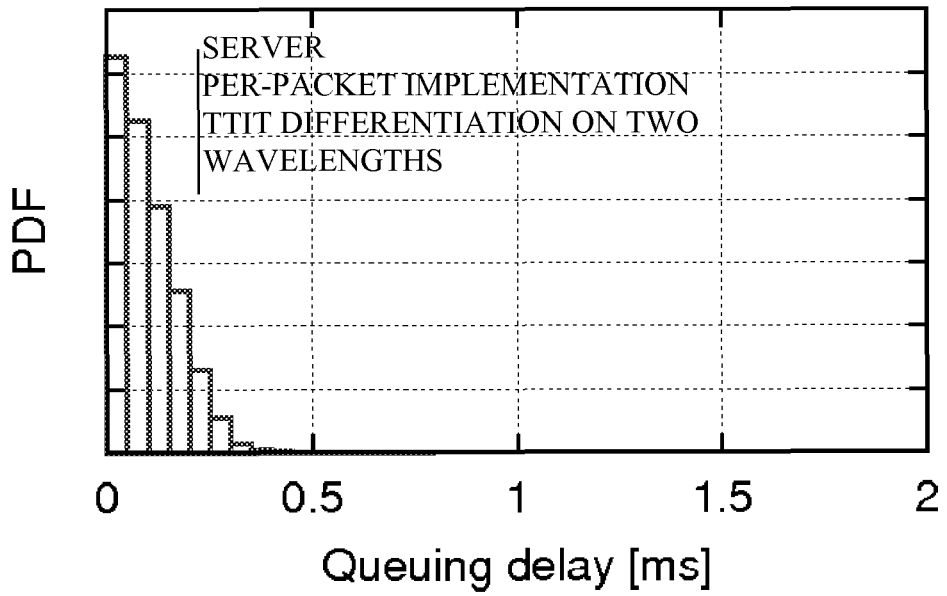

FIGS. 14 to 27 show the probability density functions (PDF) of the latency for both a server-originated and a client-originated probe connection (in other words the graphs show likelihoods of different packet delays, so it is desirable that the shorter delays have greater likelihood, and that the maximum delay for any packet, shown where the graph reaches zero, is as far to the left as possible. FIGS. 14 and 15 show the PDF using the conventional queuing policy for reference, where W is 16 and load is 90%. FIGS. 16 and 17 show the PDF using the per-packet MTIT queue policy but without TTIT differentiation where W is 16 and the load is 90%. FIGS. 18 and 19 show PDF using both the per-packet MTIT queue policy and the TTIT differentiation with $W_d=2$. The per-packet MTIT queue policy is able to significantly shrink the server delay distribution, now bounded to less than 600 µs (160 µs on average) for W=16. However this is paid with a slightly wider client node delay distribution, whose tail reaches 3.5 ms (1 ms on average) with W=16. The TTIT differentiation succeeds in reducing both server and client latency compared to the previous schemes, thanks to its capabilities to adapt to traffic characteristics. With W=16, server delay is bounded to 500 µs (on average 140 µs), while client delay tail stops at 1.4 ms (on average 506 µs).

Figure 25:
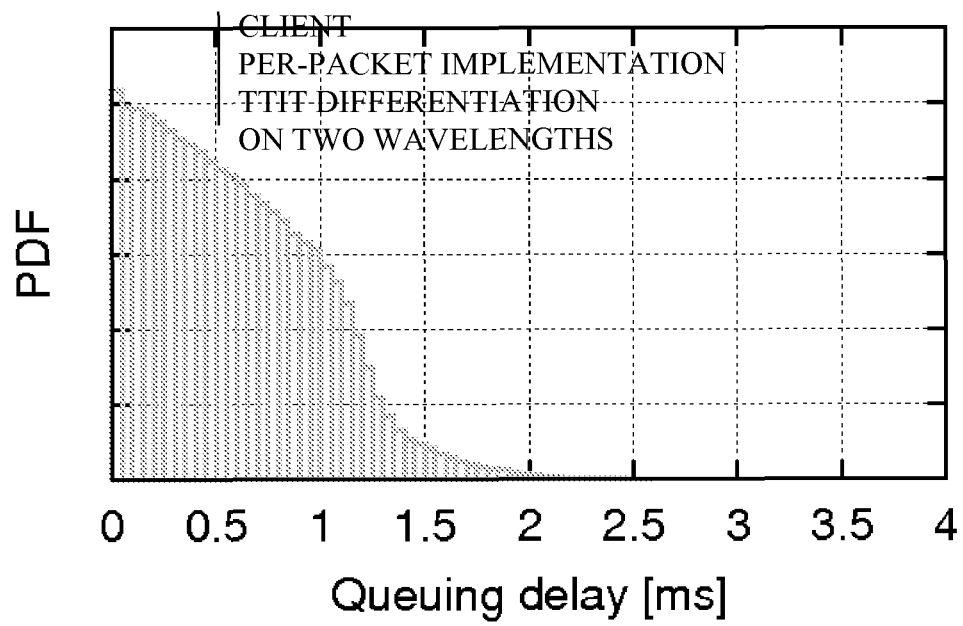

FIGS. 20 to 25 show similar cases to FIGS. 14 to 19 respectively, but with W=32, and the benefits for client traffic of TTIT differentiation with $W_d=2$ are lower, as shown in FIG. 25. However, by adjusting $W_d$ (as in FIGS. 26 and 27 with $W_d=4$), the client queuing delay PDF can be shrunk, so that distribution tails stop before 1.5 ms.

Figure 28:
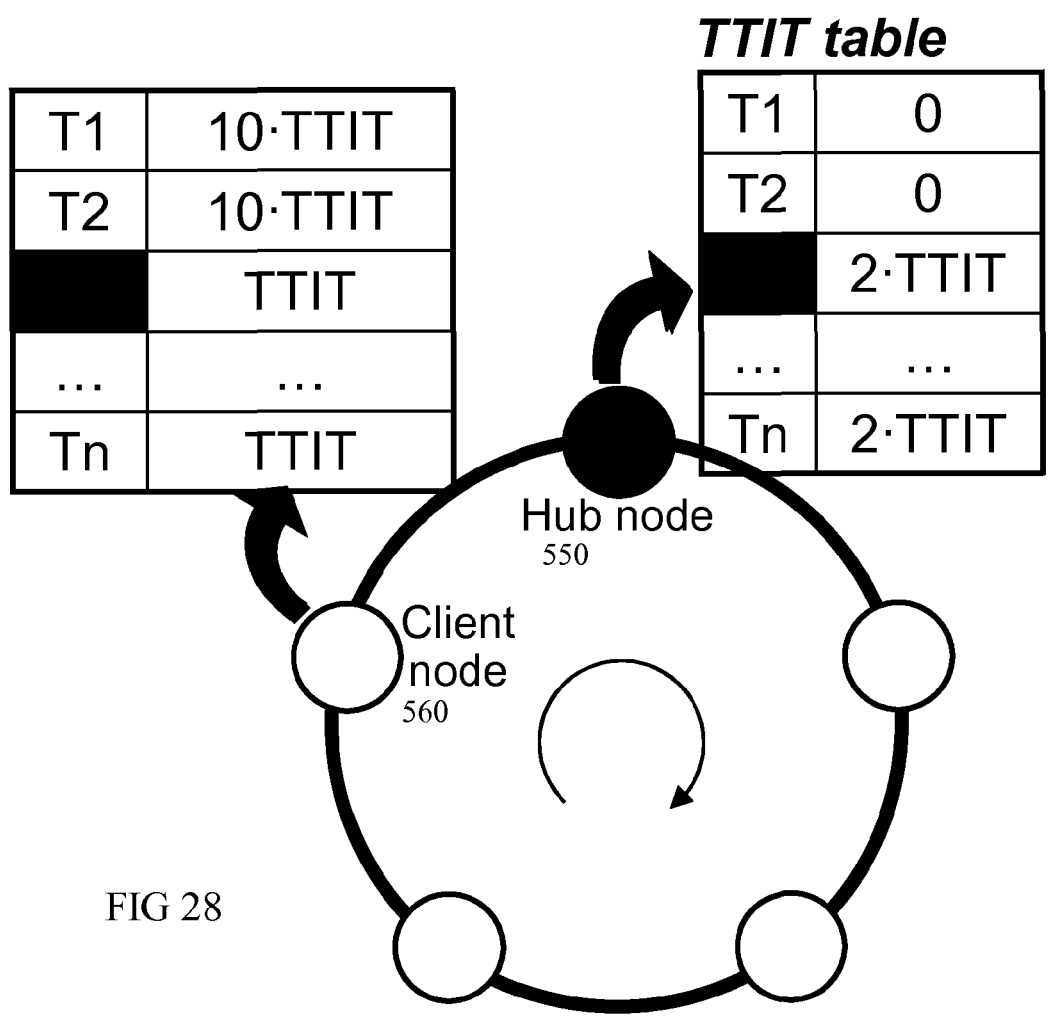
FIG. 28 shows a schematic view of a network having multiple nodes in a ring topology, and showing a hub node and a client node each having different target holding times which are also different for different optical channels.
Figure 29:
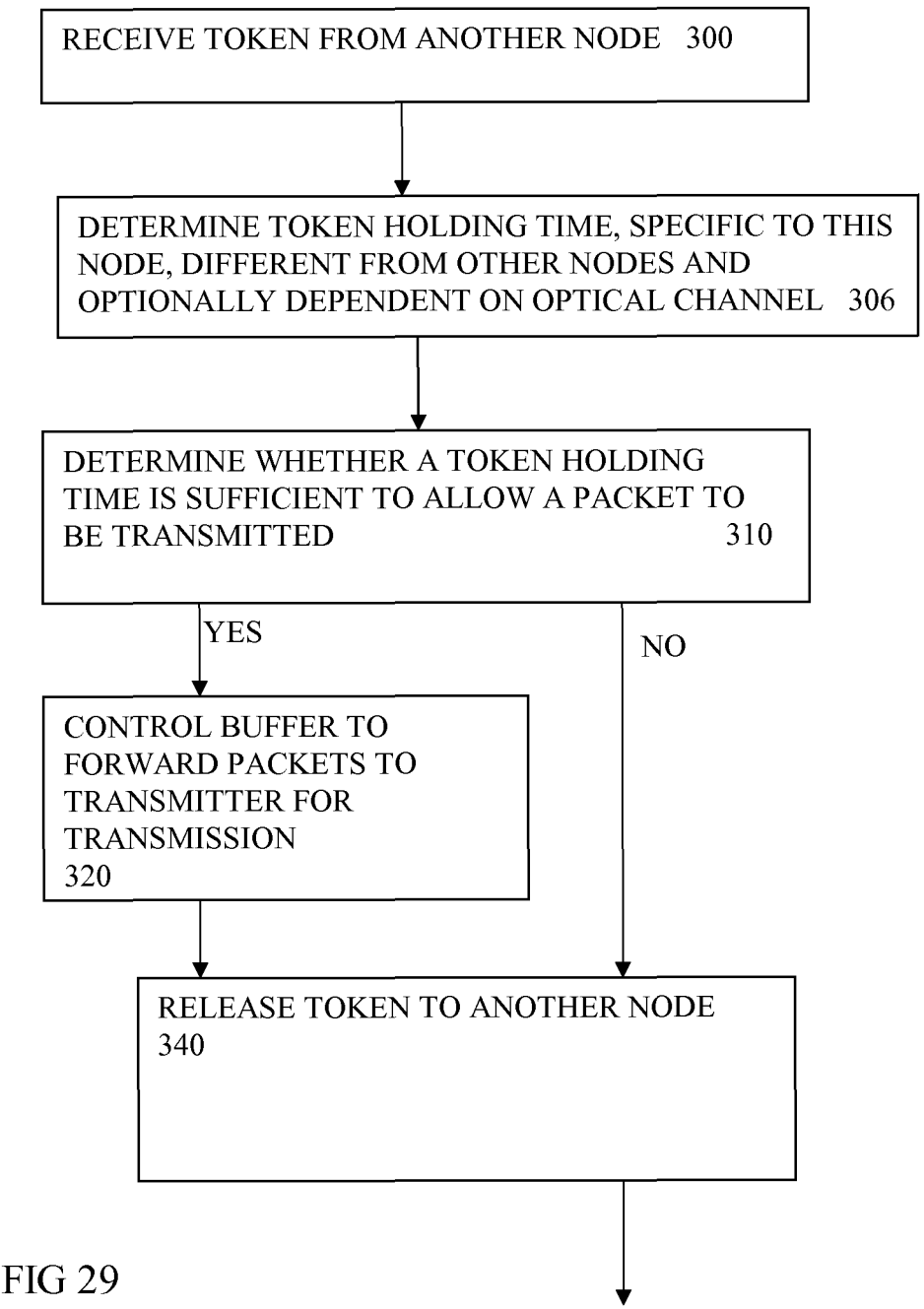
FIG. 29 shows steps according to a further embodiment, where the token holding time is determined to be different for different nodes.

FIGS. 28 and 29 Token Holding Time Differentiation Between Nodes

Another feature will now be described which can also address the same issues that multi token medium access protocols, such as MTIT are not optimal for strongly asymmetrical traffic, so that nodes downstream the server may suffer from longer delays because tokens are often delayed by lengthy server transmissions. To help reduce or avoid this issue, a per-node per-wavelength TTIT differentiation suitable to support rings with asymmetrical traffic can be implemented. Contrary to classical MTIT, where TTIT was identical for all nodes and wavelengths, in this solution a node can have a different token holding time compared to that for other nodes. This can be implemented by having a different target time, or a different algorithm for calculating the holding time from the target time for example. In either case, another option is to have the token holding time also differ according to which channel the token relates to.

In principle the token holding time can be calculated locally by the node itself or remotely. In the latter case the token itself may carry an indication of how the token holding time should differ for different nodes, or for different channels. In one implementation each node keeps a table where different TTIT values are assigned for that node, compared to the value for other nodes. Nodes with high volumes of traffic, such as VoD servers or hub nodes could take a larger share of the available resources than client nodes. By appropriately setting TTIT values in each node's table, client nodes can be granted access to specific wavelengths where server traffic injection is limited, and on the other hand, server can better exploit the remaining wavelength channels. In such a way, it is possible to reduce the effect of the dominant server traffic on the downstream clients, without impacting significantly its latency performance.

In the network shown in FIG. 28, a hub node 550 has a TTIT table showing target token inter arrival times for different channels. For T1 and T2, the target is zero, indicating this node should not transmit traffic on those channels. For the remaining channels the target is 2 units of time, indicating this node can take more holding time than other nodes for these channels, to reflect that as a hub node there will be more traffic from this node.

FIG. 28 also shows a table for another of the nodes, a client node 560. In this case the client node has 10 units of target time for the first two channels and one unit of time for the remaining channels. Other client nodes may have disproportionate amounts of target time on the same first and second channels, or on different channels. In principle the target times could be the same for all channels of each node. In principle, the target times could be different for different channels and the same for all nodes, but better fairness and latency can usually be achieved by having different target times for different nodes and different channels.

FIG. 29 shows steps according to an embodiment having different token holding times for different nodes. At step 300 a token is received from another node. At step 306, the token holding time is determined, specific to this node, different from other nodes and optionally dependent on which of the optical channels corresponds to the token. As before, at step 310 it is determined whether a token holding time is sufficient to allow a packet to be transmitted. If so, then control signals are sent to the buffer to cause it to forward a packet or packets to the transmitter for transmission. Otherwise the token is released to the next node at step 340. The token holding time differentiation can be implemented in various ways. For example the target time can be set to be different for different nodes, or the algorithm for determining the holding time can be different. In either case, this can be set up manually by an operator as part of the installation of the node, or can be adapted dynamically during operation. Such dynamic adaptation can be based on the length of queue at the node, compared to queues at other nodes. Whichever of the nodes has the longest queue, can be arranged to increase its or their token holding times, by means of a negotiation between nodes, or by manual control by an operator.

Correspondingly, nodes with shorter queues can adapt to use shorter token holding times.

Optionally this embodiment can be combined with features of other embodiments, so in some cases sufficient packets to fill the token holding time can be forwarded, in other cases, the token holding time can be recalculated as described above.

Concluding Remarks

As has been described above, embodiments can help constrain queuing latency in multi-token WDM optical packet rings under asymmetrical traffic by particular queue management features. Some embodiments involve queue management involving a per-packet MTIT queue policy at nodes. Others involve implementing a TTIT differentiation per node and per wavelength as an alternative or in combination with the per-packet policy. These queue management policies can reduce queuing delay particularly for asymmetric traffic such as server- and client-originating traffic by adapting to asymmetrical traffic characteristics. A node (260, 50) for a multi-token optical communications network has optical channels between the node and other nodes, each channel having a token (T1, T2, T3), passed between nodes, to indicate that a corresponding optical channel is available for transmission during a token holding time. The node has a transmitter (280) for transmitting packets over the optical channels, a buffer (170, 270) for queuing packets before transmission, and a transmit controller (170, 290) configured to control the buffer to forward an initial packet or packets from the buffer to the transmitter once a token has been received. The transmit controller determines how much of the token holding time remains after the transmission of the initial packet or packets, and then controls the buffer to forward a further packet according to the remaining token holding time. A maximum packet delay can be reduced where there is asymmetric traffic. A token holding time can be different for different nodes. Other variations and embodiments can be envisaged within the claims.

The invention claimed is:

1. A node suitable for a multi-token optical communications network, the network having optical channels between the node and other nodes, the network being arranged so that nodes hold and pass unique tokens, each token indicating to a node that a corresponding one or more of the optical channels is available for transmission while that node holds that token, during a token holding time, the node comprising:
   a transmitter for transmitting packets to the other nodes over the optical channels, a buffer for queuing packets before transmission by the transmitter, and
   a transmit controller configured to:
   control the buffer to forward at least one initial packet from the buffer to the transmitter once a token has been received, the at least one initial packet forwarded to the transmitter for transmission over an optical channel corresponding to the token and according to the token hold time;
   after the at least one initial packet is forwarded from the buffer to the transmitter, determine how much of the token holding time remains; and
   after determining how much of the token holding time remains, control the buffer to forward a further packet from the buffer to the transmitter according to the remaining token holding time.

2. The node of claim 1, the transmit controller being configured to determine the remaining token holding time for each packet.

3. The node of claim 1, the transmit controller being configured to receive a further token, corresponding to another one or more of the optical channels, and to control the buffer to forward another one or more of the packets from the buffer to the transmitter, according to a current token holding time in respect of the further token, for transmission over the another one or more of the optical channels, the transmitter being arranged to transmit the another one or more of the packets at the same time as the transmission of the initial packet or packets.

4. The node of claim 1, the transmit controller being configured to determine the token holding time according to an interval between successive arrival times of different tokens arriving at the node.

5. The node of claim 4, the transmit controller being configured to determine the token holding time to have a dependency on the optical channel corresponding to the token.

6. The node of claim 5, the dependency of token holding time on the optical channel being arranged to provide preferential access to one or more of the optical channels by the node, compared to others of the nodes.

7. The node of claim 1, the transmit controller being configured to select which of the packets in the buffer to forward as the initial or the further packet or packets, according to a size of the packet and according to the token holding time or the remaining token holding time.

8. The node of claim 1, the transmit controller being arranged to estimate a transmission duration of the forwarded packet or packets, and to determine the remaining token holding time according to the estimated transmission duration.

9. The node of claim 1, the optical channels being different optical wavelengths, and the transmitter having multiple optical sources arranged to transmit different packets on different wavelengths simultaneously.

10. A method of operating a multi-token optical communications network the network having optical channels between the node and other nodes, the network being arranged so that nodes hold and pass unique tokens, each token indicating to a node that a corresponding one or more of the optical channels is available for transmission while that node holds that token, during a token holding time, the method comprising:
  queuing packets in a buffer before transmission,
  controlling the buffer to forward at least one initial packet from the buffer to a transmitter for transmitting packets to the other nodes over the optical channels, once a token has been received, for transmission over an optical channel corresponding to the token and according to the token hold time,
  after the at least one initial packet is forwarded from the buffer to the transmitter, determining how much of the token holding time remains, and
  after determining how much of the token holding time remains, controlling the buffer to forward a further packet from the buffer to the transmitter according to the remaining token holding time.

11. The method of claim 10, having the steps of receiving a further token, corresponding to another one or more of the optical channels, and controlling the buffer to forward another one or more of the packets from the buffer to the transmitter, according to a current token holding time in respect of the further token, for transmission over the another one or more of the optical channels, and transmitting the another one or more of the packets at the same time as the transmission of the initial packet or packets.

12. The method of claim 10, having the step of determining the token holding time according to an interval between successive arrival times of different tokens arriving at the node.

13. The method of claim 12, having the step of determining the token holding time to have a dependency on the optical channel corresponding to the token.

14. A computer program on a computer readable medium, for use in a transmit controller of a node of a multi-node optical communications system, the program when executed by a processor being arranged to carry out the steps of claim 10.

15. An optical network having a first node and other nodes, each of the nodes being suitable for a multi-token optical communications network, the network having optical channels between the nodes, the network being arranged so that nodes hold and pass unique tokens, each token indicating to a node that a corresponding one or more of the optical channels is available for transmission while that node holds that token, during a token holding time, the first node comprising:
  a transmitter for transmitting packets to the other nodes over the optical channels,
  a buffer for queuing packets before transmission by the transmitter, and
  a transmit controller configured to:
    control the buffer to forward at least one initial packet from the buffer to the transmitter once a token has been received, the at least one initial packet forwarded to the transmitter for transmission over an optical channel corresponding to the token and according to the token hold time, and the first node being arranged to have a different token holding time than the other nodes on at least some of the optical channels;
    after the at least one initial packet is forwarded from the buffer to the transmitter, determine how much of the token holding time remains; and
    after determining how much of the token holding time remains, control the buffer to forward a further packet from the buffer to the transmitter according to the remaining token holding time.

16. The network of claim 15, the transmit controller being configured to determine the token holding time to have a dependency on the optical channel corresponding to the token.

17. A method of operating a multi-token optical communications network the network having optical channels between a first node and other nodes, the network being arranged so that nodes hold and pass unique tokens, each token indicating to a node that a corresponding one or more of the optical channels is available for transmission while that node holds that token, during a token holding time, the method performed at the first node and comprising:
  queueing packets in a buffer before transmission;
  controlling the buffer to forward at least one initial packet from the buffer to a transmitter for transmitting packets to the other nodes over the optical channels, once a token has been received, for transmission over an optical channel corresponding to the token and according to the token hold time, wherein the first node has a different token holding time than the other nodes for at least some of the optical channels channels;
  after the at least one initial packet is forwarded from the buffer to the transmitter, determine how much of the token holding time remains; and
  after determining how much of the token holding time remains, control the buffer to forward a further packet from the buffer to the transmitter according to the remaining token holding time.

\* \* \* \* \*